US007339521B2

(12) United States Patent
Scheidemann et al.

(10) Patent No.: US 7,339,521 B2

(45) Date of Patent: Mar. 4, 2008

(54) ANALYTICAL INSTRUMENTS USING A PSEUDORANDOM ARRAY OF SOURCES, SUCH AS A MICRO-MACHINED MASS SPECTROMETER OR MONOCHROMATOR

(76) Inventors: Adi Scheidemann, 138 29th Ave., Seattle, WA (US) 98122; Henry Hess, 4060 9th Ave., NE., Apt. 507, Seattle, WA (US) 98105

( * ) Notice: Subject to any disclaimer, the term of this patent is extended or adjusted under 35 U.S.C. 154(b) by 41 days.

(21) Appl. No.: 10/502,842

(22) PCT Filed: Feb. 20, 2003

(86) PCT No.: PCT/US03/05517

§ 371 (c)(1),
(2), (4) Date: Jan. 18, 2005

(87) PCT Pub. No.: WO03/071569

PCT Pub. Date: Aug. 28, 2003

(65) Prior Publication Data

US 2005/0119868 A1 Jun. 2, 2005

Related U.S. Application Data

(60) Provisional application No. 60/358,124, filed on Feb. 20, 2002.

(51) Int. Cl.

*G01S 3/04* (2006.01)
*G01S 3/801* (2006.01)
*G01S 3/781* (2006.01)
*G01S 3/86* (2006.01)

(52) U.S. Cl. ...................... 342/379; 342/179; 343/753; 343/767; 343/893; 343/909; 73/602

(58) Field of Classification Search ................. 342/372
See application file for complete search history.

(56) References Cited

U.S. PATENT DOCUMENTS 3,053,961 A 9/1962 Rodgers, Jr. et al.

(Continued)

FOREIGN PATENT DOCUMENTS

EP 0 317 052 A2 * 11/1987

(Continued)

OTHER PUBLICATIONS

F. Jessie MacWilliams and Neil J. A. Sloane, "Pseudo-Random Sequences and Arrays", Aug. 1976, Proceeding of the IEEE, vol. 64, No. 12, pp. 1715-1729.*

(Continued)

*Primary Examiner*—Hezron Williams
*Assistant Examiner*—Rose M Miller
(74) *Attorney, Agent, or Firm*—Greenlee, Winner and Sullivan, P.C.

(57) ABSTRACT

Novel methods and structures are disclosed herein which employ pseudorandom sequences to spatially arrange multiple sources in a pseudorandom source array. The pseudorandom source array can replace the single source in analytical instruments relying on spatial separation of the sample or the probe particles/waves emitted by the sources. The large number of sources in this pseudorandom source array enhances the signal on a position sensitive detector. A mathematical deconvolution process retrieves a spectrum with improved signal-to-noise ratio from the detector signal.

47 Claims, 20 Drawing Sheets

U.S. PATENT DOCUMENTS

| | | | | |
|---|---|---|---|---|
| 3,622,967 | A | 11/1971 | Foster et al. | |
| 4,052,723 | A | 10/1977 | Miller | |
| 4,071,848 | A * | 1/1978 | Leeper | 343/844 |
| 4,460,059 | A | 7/1984 | Katz | |
| 4,476,551 | A | 10/1984 | Ruehle | |
| 4,559,605 | A | 12/1985 | Norsworthy | |
| 4,574,311 | A | 3/1986 | Resnikoff et al. | |
| 4,701,762 | A | 10/1987 | Apostolos | |
| 4,855,747 | A * | 8/1989 | Steinberg | 342/179 |
| 4,922,362 | A | 5/1990 | Miller et al. | |
| 5,038,149 | A * | 8/1991 | Aubry et al. | 342/372 |
| 5,299,577 | A * | 4/1994 | Brown et al. | 600/443 |
| 5,331,158 | A * | 7/1994 | Dowell | 250/287 |
| 5,385,050 | A | 1/1995 | Roberts | |
| 5,385,457 | A | 1/1995 | Cohen | |
| 5,929,819 | A * | 7/1999 | Grinberg | 343/754 |
| 6,025,591 | A | 2/2000 | Taylor et al. | |
| 6,135,971 | A * | 10/2000 | Hutchinson et al. | 601/3 |
| 6,154,174 | A | 11/2000 | Snider et al. | |
| 6,182,831 | B1 | 2/2001 | Scheidemann et al. | |
| 6,198,096 | B1 | 3/2001 | Le Cocq | |
| 6,292,758 | B1 | 9/2001 | Gilbert et al. | |
| 6,300,626 | B1 | 10/2001 | Brock et al. | |
| 6,488,603 | B2 | 12/2002 | Lim et al. | |
| 6,649,908 | B2 * | 11/2003 | Apffel et al. | 250/288 |
| 6,843,375 | B2 | 1/2005 | Kohner | |
| 6,847,036 | B1 | 1/2005 | Darling | |
| 6,906,333 | B2 | 6/2005 | Scheidemann | |
| 2005/0248826 | A1 * | 11/2005 | Tsarev | 359/285 |

FOREIGN PATENT DOCUMENTS

| | | |
|---|---|---|
| EP | 0331585 | 12/1993 |
| WO | WO99/17865 | 4/1999 |
| WO | WO00/20851 | 4/2000 |

OTHER PUBLICATIONS

P. J. Treado and M. D. Morris "Multichannel Hadamard Transform Raman Microscopy," Applied Spectroscopy vol. 44(1), pp. 1-4, 1990.

Brock et al. (2000) "Characterization of a Hadmard Transform Time-of-Flight Mass Spectrometer" Rev. Sci Inst 71(3):1306-1318.

Glaeser et al. (1969) "The use of Pseudorandom Neutron Time-of-Flight Techniques for Lattice Dynamics and Diffraction Studies" Acta Crystallographica A A25:S250.

Gompf et al. (1968) "The use of a pseudo-statistical chopper for time of flight measurements," in *Neutron Inelastic Scattering*, Proceedings of a Symposium on Neutron Inelastic Scattering (International Atomic Energy Agency, Vienna, Austria) Copenhagen, May 20-25, 1968, vol. II 417-427.

Kaneta (2001), "A possible solution to the poor sensitivity of CE," Analytical Chemistry 73:540A-547A.

Koleske et al. (1992) "Generation of Pseudorandom Sequences for use in Cross-Correlation Modulation," Rev. Sci Inst. 63(8):3852-3855.

Nowikow et al. (1979) "Cross-Correlation Time-of-Flight Analysis of Molecular Beam Scattering," J. Phys. E. 12:515-521.

Pal et al. (1968) "Correlation-type Time-of-Flight Spectrometer with Magnetically Chopped Polarized Neutron Beam." Symposium on neutron nelastic scattering, Copenhagen, IAEA (publisher), 2:407-416.

Wiley et al. (1955) "Time-of-Flight Mass Spectrometer with Improved Resolution," Rev. Sci. Inst. 26(12):1150-1157.

Wilhelmi et al. (1970) "Binary Sequences and Error Analysis for Pseudo-Statistical Neutron Modulators with Different Aduty Cycles," Nuclear Instruments and Methods in Physics Research, A81:36-44.

* cited by examiner

| | | |
|---|---|---|
| PR-Sequence: | 1; 1; 1; 0; 1; 0; 0 | 801 |
| Deconvolution Sequence: | 1; 1; 1;-1; 1;-1;-1 | 802 |
| Spectrum: | 0; 2; 0; 3; 0; 0; 0 | 803 |

Analytical instrument:

806

| Detector | A | B | C | D | E | F | G | Detected signal |
|---|---|---|---|---|---|---|---|---|
| | Signal from Emitter/blank | | | | | | | |
| #1 | 0 | 0 | 0 | - | 0 | - | - | 0 |
| #2 | 2 | 0 | 0 | - | 0 | - | - | 2 |
| #3 | 0 | 2 | 0 | - | 0 | - | - | 2 |
| #4 | 3 | 0 | 2 | - | 0 | - | - | 5 |
| #5 | 0 | 3 | 0 | - | 0 | - | - | 3 |
| #6 | 0 | 0 | 3 | - | 2 | - | - | 5 |
| #7 | 0 | 0 | 0 | - | 0 | - | - | 0 |
| #8 | 0 | 0 | 0 | - | 3 | - | - | 3 |
| #9 | 0 | 0 | 0 | - | 0 | - | - | 0 |
| #10 | 0 | 0 | 0 | - | 0 | - | - | 0 |
| #11 | 0 | 0 | 0 | - | 0 | - | - | 0 |
| #12 | 0 | 0 | 0 | - | 0 | - | - | 0 |
| #13 | 0 | 0 | 0 | - | 0 | - | - | 0 |

807

Computer: Deconvolution

| Detected signal | Convoluted sequence |
|---|---|
| 0 | 0+3 =3 |
| 2 | 2+0 =2 |
| 2 | 2+0 =2 |
| 5 | 5+0 =5 |
| 3 | 3+0 =3 |
| 5 | 5+0 =5 |
| 0 | 0 =0 |
| 3 | |
| 0 | |
| 0 | |
| 0 | |
| 0 | |
| 0 | |

808

X

Deconvolution sequence

| Channel: #1 | #2 | #3 | #4 | #5 | #6 | #7 |
|---|---|---|---|---|---|---|
| 1 | -1 | -1 | 1 | -1 | 1 | -1 |
| 1 | 1 | -1 | -1 | 1 | -1 | 1 |
| • | 1 | 1 | -1 | -1 | 1 | -1 |
| -1 | 1 | 1 | 1 | -1 | -1 | 1 |
| •' | -1 | 1 | 1 | 1 | -1 | -1 |
| -1 | 1 | -1 | 1 | 1 | 1 | -1 |
| -1 | -1 | 1 | -1 | 1 | 1 | 1 |
| 0 | 8 | 0 | 12 | 0 | 0 | 0 |

809

811

= sum [convoluted sequence(i)deconvolutionsequence(i) ] over i from 1 to 7

Spectrum: 0 8 0 12 0 0 0

ANALYTICAL INSTRUMENTS USING A PSEUDORANDOM ARRAY OF SOURCES, SUCH AS A MICRO-MACHINED MASS SPECTROMETER OR MONOCHROMATOR

CROSS-REFERENCE TO RELATED APPLICATIONS

This application is a 371 of PCT/US03/05517, filed Feb. 20, 2003 and claims the benefit of U.S. Provisional Patent Application No. 60/358,124, filed Feb. 20, 2002, each of which are incorporated by reference in its entirety herein.

STATEMENT REGARDING FEDERALLY SPONSORED RESEARCH

This invention was made with U.S. Government support under National Science Foundation Grant No. BIR-9214821. The United States government may have certain rights in this invention.

BACKGROUND OF THE INVENTION

Analytical instruments are useful in performing research, testing, diagnostics and other types of work. Analytical instruments 10 may operate in the space domain as illustrated in FIG. 1A, or in the time domain as illustrated in FIG. 1B.

As illustrated in FIGS. 1A and 1B, analytical instruments 10 typically employ three fundamental components: a source 12, a disperser 14; and a detector 16. The source 12 typically takes one of two forms: i) emitting a sample to be tested, or ii) emitting a probe in the form of particles (e.g., ions) or waves (e.g. electromagnetic radiation or sound). The disperser 16 also typically takes one of two forms: i) a discrete dispersing element, or ii) the sample itself dispersing the probe particles or waves. The disperser 14 disperses the sample or probe in time or space. The detector 16 also takes one of two forms: i) detecting the sample, or ii) detecting the probe particles or waves, as a function of time or space. The detector 16 produces a detector signal as a function of detected time or detected position, which is referred to as a "spectrum" and which provides information about the sample being tested.

FIG. 2A shows an example of a conventional analytical instrument in the form of a Wiley-McLaren-type time-of-flight mass spectrometer (Wiley and McLaren 1955), where a sample of ions is dispersed in time according to ion mass-to-charge ratio. FIG. 2B shows another example of a conventional analytic instrument in the form of a Czerny-Tumer-type optical monochromator, where light is dispersed in space according to its wavelength.

In general, the design of analytical instruments is governed by scaling laws, describing how changes in parameters like the size of the source, the size of the dispersing element, the resolution, and the sensitivity are interrelated. In most cases, the resolution improves as smaller sources (for position sensitive detection) or shorter pulses (for time sensitive detection) are used. In the case of the Wiley-McLaren-type time-of-flight mass spectrometer, illustrated in FIG. 2A, the resolution is proportional to the length of the flight path. Therefore, resolution can be improved by enlarging the instrument if the dimensions of the ion source are fixed. In the case of the Czerny-Turner-type optical monochromator, illustrated in FIG. 2B, sensitivity is proportional to the optical aperture of the instrument, again favoring the design of large instruments.

Miniaturization of analytical instruments, which is highly desirable based on considerations such as cost and portability, often requires the circumvention of these scaling relations, since otherwise device performance is reduced to an unacceptable low level. A prominent problem stemming from miniaturization is the reduction of sample volume or intensity, due to the smaller source, causing a proportionally reduced signal at the detector and thus a reduced signal-to-noise ratio, if the noise stems mainly from the detector, as is often the case. Thus, there is a need for miniaturized analytical instruments with relatively good signal-to-noise ratios. There is also a need for conventionally sized analytical instruments with higher signal-to-noise ratios than found in typical existing analytical instruments.

BRIEF SUMMARY OF THE INVENTION

The signal-to-noise ratio determines the sensitivity of analytical instruments. It is therefore desirable to maximize the signal for a given level of detector noise. Multiplexing techniques, which allow an increased duty cycle for pulsed sources or the utilization of multiple sources in parallel, can improve the signal-to-noise ratio. Pseudorandom sequences have been previously used to increase the duty cycle of pulsed source in various instruments. In one aspect, novel methods and structures are disclosed herein which employ pseudorandom sequences to spatially arrange multiple sources in a pseudorandom source array. The pseudorandom source array can replace the single source in analytical instruments relying on spatial separation of the sample or the probe particles/waves emitted by the sources. The large number of sources in this pseudorandom source array enhances the signal on a position sensitive detector. A mathematical deconvolution process retrieves a spectrum with improved signal-to-noise ratio from the detector signal. The improved signal-to-noise ratio can allow dramatic improvements of the analytical instruments employing the pseudorandom source array. Most notably it allows the miniaturization of some instruments, a prerequisite for a wide array of new applications.

The invention is further illustrated and exemplified by the figures and the following detailed description.

DETAILED DESCRIPTION OF THE INVENTION

Figure 3A:
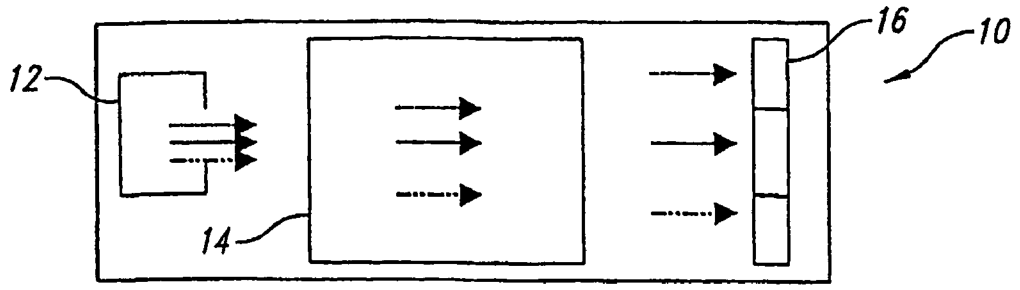
FIG. 3A (Prior Art)
FIG. 3A is a schematic diagram illustrating a conventionally sized analytical instrument employing a relatively large source to produce a relatively large signal.
Figure 3B:
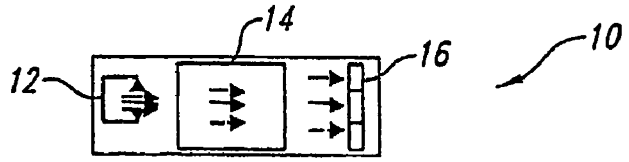
FIG. 3B is a schematic diagram illustrating one approach to miniaturization of an analytical instrument, employing a smaller source and resulting in a reduced detector signal.
Figure 3C:
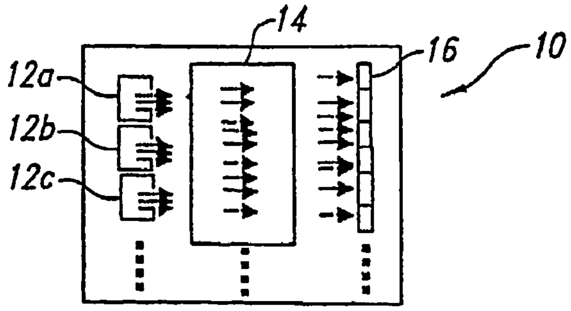
FIG. 3C is a schematic diagram illustrating another approach to miniaturization of an analytical instrument, employing multiple small sources each working in parallel and resulting in a uselessly scrambled spectrum.

FIGS. 3A-3C schematically illustrate possible approaches to the miniaturization of a conventional analytical instrument 10. The conventionally sized analytical instrument 10 illustrated in FIG. 3A, employs a relatively large source 12 resulting in a relatively large signal at the detector 14. FIG. 3B schematically illustrates a miniaturized analytical instrument 10 employing a proportionately smaller source 12 that results in a proportionately smaller signal at the detector 14 which hinders the usefulness of such an instrument 10. FIG. 3C schematically illustrates a miniaturized analytical instrument 10 employing a number of smaller sources 12*a*, 12*b*, 12*c* operating in parallel, that results in a large, but uselessly scrambled spectrum.

This invention provides a solution not previously recognized in the art that can operate a large number of miniaturized sources in parallel, without significantly enlarging the device, and wherein the spatial or temporal sequence of sample components can still be assigned.

The term source is used broadly herein to refer to any device or combination of devices and/or structures that emits a sample to be tested, or emits a probe in any form which is employed to interrogate a sample or samples, such as particles (e.g., ions) or waves (e.g., electromagnetic radiation of various wavelengths or sound). The term refers to single or individual sources as well as to arrays or assemblies of multiple sources and particularly to spatial defined arrays or assemblies of sources. The sample emitted by a source can be in any form, e.g., a gas, liquid (e.g., spray), or particles (e.g., ions, aerosol particles, etc.). The sample may contain one or more components to be tested, optionally in the presence of components that are not to be tested (e.g., solvents) and optionally in the presence of one or more components present in defined amounts or having defined properties to be used as standards. Probe waves emitted by the source include waves such as x-rays, infrared radiation, visible radiation, microwaves, etc. The source may be an array of ion sources for use in mass spectrometric analysis. The source may, emit electromagnetic radiation in a spatially defined manner, for example, by passing radiation emitted by one or more sources through a spatially defined array of slits, or other apertures to generate a spatially defined array of sources of that radiation. It is generally preferred in the spatially defined source arrays or assemblies of this invention that the plurality of sources in the array emit samples or probes that are similar in intensity (e.g., for radiation) or amount. The more similar the sources in an array are in such properties, the higher the signal-to-noise ratio of the analytical measurements made using the array of sources will be.

For devices based on temporal separation of the sample, an improvement in the signal-to-noise ratio can be achieved by employing a source which is continuously emitting multiple pulses in a so-called "Pseudorandom sequence" (also known as "Hadamard-sequence"). The special properties of the pseudorandom sequence allow the deduction of the temporal sequence of sample components arriving at the detector, even though different sample components originating from different pulses may arrive at the same time at the detector.

The pseudorandom method has been used successfully in the time domain for specialized measurement methods with signal-to-noise problems, such as slow neutron scattering. The main incentive of the time domain approach is to reduce the acquisition time for each measurement. Below, we describe several novel approaches which utilize pseudorandom method sequences in the space domain, allowing the miniaturization of various analytical instruments.

Pseudorandom Sequences

Pseudorandom sequences are sequences of two different numbers, usually chosen to be 1 and 0, which satisfy three criteria (Koleske and Sibener 1992): (1) the sequence recurs after $N=2n-1$ steps, (2) the autocorrelation of the sequence sums to $2n-1$, (3) the cross-correlation of the sequence sums to $2n-2$.

For example the sequence . . . 110110 . . . satisfies the criteria for a pseudorandom sequence of length N=3 (110) with n=2, autocorrelation of 2 ($1\times1+1\times1+0\times0$), and cross-correlation 1 ($1\times1+1\times0+0\times1=1$, and $1\times0+1\times1+0\times1=1$).

The name "pseudorandom" derives from the constant value of the cross-correlation function, which is the characteristic of "random" white noise. The sequences described above are only "pseudo"-random, since they recur after N elements.

Various pseudorandom sequences with different length can be constructed according to simple algorithms (Koleske and Sibener 1992).

Application of Pseudorandom Sequences

Pseudorandom sequences are widely used in random number generators, data encryption devices, and white noise sources. In analytical techniques the application of pseudorandom techniques has been confined to selected techniques measuring a time-of-flight, such as molecular beam scattering (Nowikow and Grice 1979), neutron inelastic scattering (Gompf, Reichardt et al. 1968; Pal, Kroo et al. 1968; Glaeser and Gompf 1969), TOF mass spectrometry (Brock, Rodriguez et al. 2000), and capillary electrophoresis (Kaneta 2001).

In conventional time-of-flight devices a short pulse (duration $\tau$) of sample is injected in the source, the different sample components traverse the dispersing region with different speeds and arrive at the detector at different times. A new sample pulse cannot be injected before the slowest sample component is detected (after time T), thus limiting the duty cycle of the instrument to $\tau/T$. Since the resolution of the time-of-flight device is defined by $R=T/\tau$ a trade-off exists between resolution and duty-cycle (affecting sensitivity).

Figure 4:
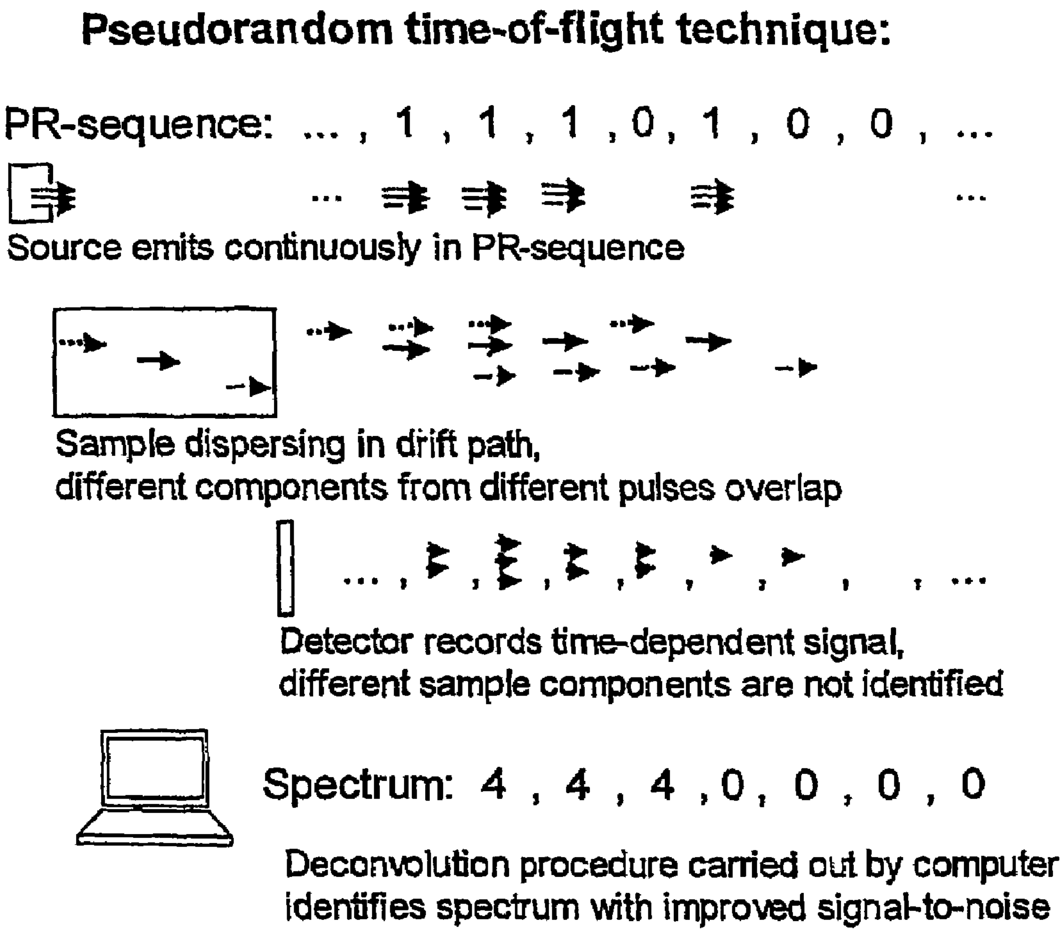
FIG. 4 (Prior Art)
FIG. 4 is a schematic diagram illustrating a pseudorandom time-of-flight technique as applied for mass spectrometry, neutron inelastic scattering, and capillary electrophoresis.

As schematically illustrated in FIG. 4, in a pseudorandom time-of-flight device, the source releases sample pulses in a pseudorandom sequence, where minimum pulse length $\tau$, maximum time-of-flight T, and sequence length $N=2n-1$ are chosen so that $\tau=T/N$. Since the number of pulses (equals number of 1's in PR sequence) is $2n-1$, the duty cycle can be improved by a factor of $2n-1$ to nearly 50% without sacrificing resolution. In contrast to the conventional method, now the detected signal at each time is not due to a single sample component anymore, but to different components released from the source at different times in the cycle. By employing a deconvolution step, the spectrum can be computed from the detector signal after an integer number of full cycles. The resulting spectrum is found to have an improved signal-to-noise ratio due to the higher duty cycle if the dominant noise source is detector noise.

In effect, the spectrum from each pulse is encoded with the pseudorandom sequence of pulses as the key, and the encoded pseudorandom spectrum is received by the detector. By decoding the pseudorandom spectrum with the known key, the spectrum with improved signal-to-noise ratio can be obtained. U.S. Pat. Nos. 6,300,626 and 6,198,096 relate to the application of pseudorandom sequences of ion pulses to mass spectrometric analysis.

In contrast to previous work applying the pseudorandom method in the time domain, we apply the pseudorandom method to the important class of analytical instruments which separate the sample or a probe originating from or interacting with the sample in the space domain.

Two well-known examples of analytical instruments are mass spectrometers using magnetic fields, and optical monochromators.

Referring to FIG. 3C, the apparatus 10 includes a source array 12 assembled from $2n-1$ individual sources 12*a*-12*n*, which are arranged side by side in a pseudorandom sequence of length $N=2n-1$, a dispersing element 14, which separates the sample components (or the probe components originating from or interacting with the sample) in one spatial dimension, and a detector 16, which records the signal as a function of the linear position.

For example, in the case of a magnetic field mass spectrometer, the source array 12 is formed by an array of ion emitters, the dispersing element is the magnetic field region created by one or more magnets, and the detector 16 can be an array of Faraday cups. In the case of the optical monochromator, the source 12 can be formed by an array of entrance slits, the dispersing element 14 is the grating, and the detector 16 is typically a CCD camera composed on an array of charge coupled devices.

However, the application of this novel apparatus using a "pseudorandom source array" is not limited to these two instruments, but can be applied to all instruments relying on spatial separation of the sample or probe particles interacting or originating from the sample.

This approach brings the benefits of the pseudorandom method, which are widely demonstrated for instruments separating the sample in time, to analytical instruments using spatial separation. One benefit is the increase of the detector signal by a factor of $2n-1$, causing an increase of roughly $2(n-1)/2$ in the signal to noise ratio if detector noise is the dominant noise contribution. Another, possible advantage is increased fault tolerance of the detector, since the defect of single detector elements does not fatally affect one channel of the spectrum, but is spread to a small degree over all channels.

From the perspective of miniaturization, this means that for a given signal-to-noise ratio requirement, the dimensions of the source, and therefore the dimensions of the whole instrument 10 according to the scaling laws, can be proportionally reduced. Assuming that n=9, the size of the source can be reduced at least 16-fold in one dimension, which allows drastic savings for the whole instrument in parameters like weight, cost, or vacuum pressure. In addition, miniaturized sources can be based on mechanisms drastically different from established techniques of sample injection or probe beam generation. Altogether, the use of a pseudorandom array of sources can significantly improve system performance and open new arenas for the application of different analytical techniques.

In the following, we will describe several generalized analytical instruments based on the space domain pseudorandom approach, and two specific instruments—a mass spectrometer and an optical monochromator—employing the space domain pseudorandom approach.

General Principle

Figure 5:
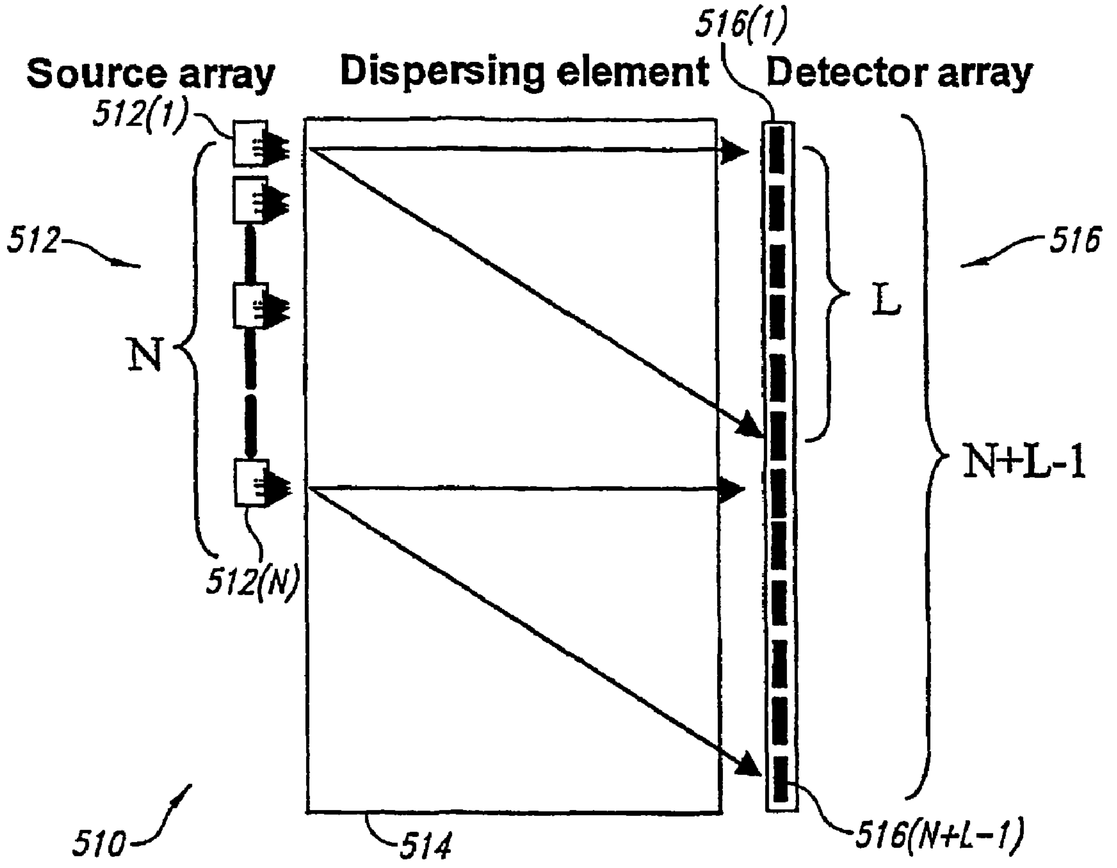
FIG. 5 is a schematic diagram illustrating a principle of a pseudorandom instrument using spatial separation including a source array consisting of sources and blanks emits the sample or the probe particles/waves, where the distance between adjacent source elements is chosen so that the corresponding spectrum on the detector is shifted by exactly one detector element and the detector array has to have a sufficient number of elements to detect the whole spectrum even of the last source. The 1's of the pseudorandom sequence are represented by sources with fixed width and the 0's of the pseudorandom sequence are represented by blank elements or inactive sources.

FIG. 5 shows a generalized analytical instrument 510. The generalized analytical instrument 510 includes a source array 512 formed by multiple individual sources 512(1, 2, . . . , N) aligned in a pseudorandom sequence to create a pseudorandom signal on a position sensitive detector 516 through the dispersing element 514. (Note that the active sources are illustrated as boxes with outward extending arrows, while the non-active sources or blanks are illustrated as short, thin bars.) The fixed distance between the elements (sources and blanks) of the source array 512 is chosen so that the detector signal stemming from adjacent source elements is shifted by one detector element. The length of the pseudorandom sequence N should be equal to or larger than the length of the spectrum L.

Since the sequence of sources does not repeat itself (in contrast to the pseudorandom pulses in the time domain), the detector 516 has to be of increased length in order to detect the complete signal contribution of the last source 512(N). (Note that the individual detectors 516(1, 2, . . . , N+L−1) are illustrated as long, thick bars.) On the detector 516 the signal contribution from the last source element is shifted by N detector elements against the signal contribution of the first source element (assuming the last element of the source array is a source and not a blank). Therefore the number of individual elements 516(1, 2, . . . , N+L−1) forming the detector array 516 should be increased by N−1 elements to N+L−1 elements with L being the length of the spectrum.

A pseudorandom spectrum with length N, which is ready for deconvolution can be created by adding the signal of the detector elements N+1 to N+L−1 to the signal of the detector elements 1 to L, with L being the length of the spectrum.

Figure 7B:
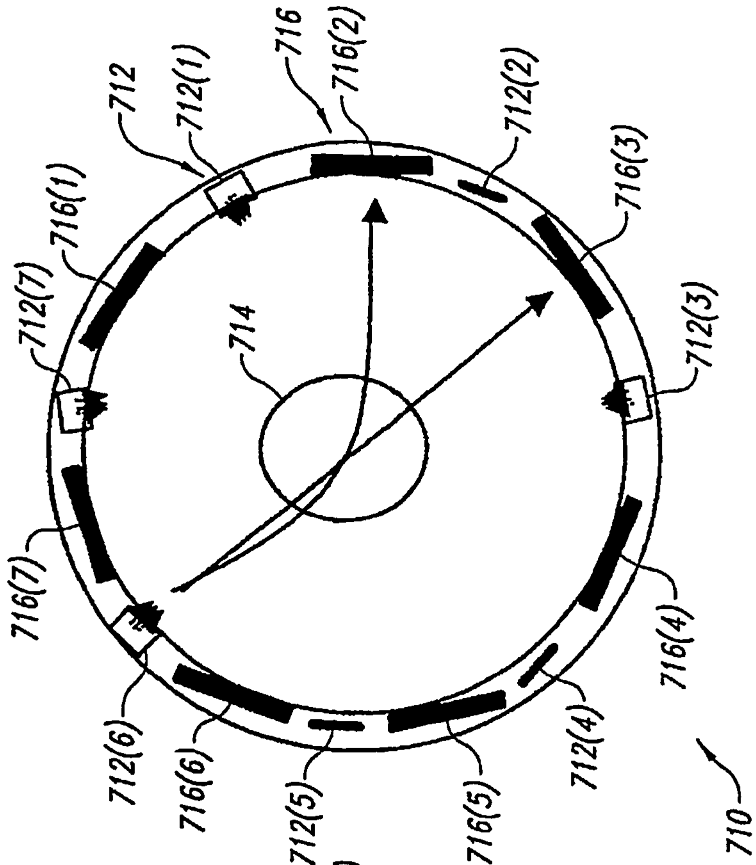
FIG. 7B is a schematic diagram illustrating a second cylindrical embodiment where due to the cylindrical symmetry of these circular arrangements of source elements and detector arrays, the implementation of the pseudorandom method is very elegant, the number of source and detector elements being chosen to be N.
Figure 7A:
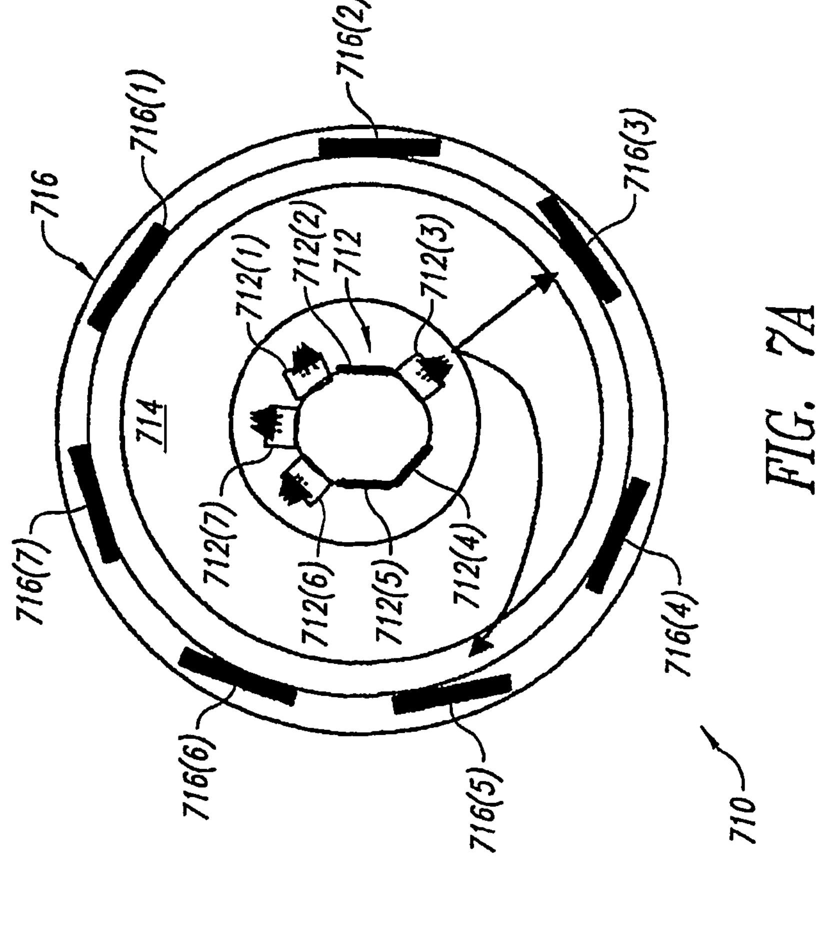
FIG. 7A is a schematic diagram illustrating a first cylindrical embodiment where due to the cylindrical symmetry of these circular arrangements of source elements and detector arrays, the implementation of the pseudorandom method is very elegant, the number of source and detector elements being chosen to be N.

FIGS. 7A and 7B show other generalized analytical instruments 710 which include concentrically circular source and detector arrays 712 and 716, respectively. (Note that the active sources are illustrated as boxes with outward extending arrows, while the non-active sources or blanks are illustrated as short, thin bars. Further note that the individual detectors 716(1, 2, . . . , N+L−1) are illustrated as long, thick bars.)

In particular, FIG. 7A shows the source array 712 spaced within a circumference of the detector array 716 with the dispersing element 714 therebetween, while FIG. 7B shows the source array 712 having a circumference coincident with the circumference of the detector array 716 with the dispersing element 714 (e.g., sample) within both circumferences. The concentric configurations illustrated in FIGS. 7A and 7B permit the analytical instruments 710 to employ a detector array of length N, instead of N+L−1. These configurations may be particularly suitable to applications such as computer aided tomography (CAT) or magnetic resonance imaging (M).

The deconvolution procedure is described in detail in several publications (Glaeser and Gompf 1969; Wilhelmi and Gompf 1970; Nowikow and Grice 1979; Brock, Rodriguez et al. 2000). Below, is a simplified mathematical discussion capturing only the essentials of the convolution process occurring in the instrument and the deconvolution process performed by the computer.

In summary, the derivation below shows, that (I) an expression for the process of signal convolution can be obtained for the pseudorandom method using spatial separation, which is equivalent to the expression of signal convolution for the time-of-flight pseudorandom method, and that (II) the signal can be deconvoluted using the same algorithm as for the time-of-flight pseudorandom mechanism, provided that all sample components fall within the length L of the spectrum.

One main difference with respect to the time-of-flight approach is that we consciously allow the spectrum to be shorter than the pseudorandom sequence. This would not be useful in the time-of-flight pseudorandom approach, since the source emits a continuous and periodic pseudorandom sequence of pulses, which are continuously detected by the detector. In this case, all the information is acquired to construct a spectrum with length N, even though the sample components might only fall into the first L elements.

However, in the case of a pseudorandom instrument using spatial separation, the sequence of N source array elements does not repeat itself, allowing us to employ a detector array with only N+L−1 elements instead of 2N−1 elements to construct a spectrum with length L. For example, a spectrum with 100 channels can be measured using a source array with N=4095 elements, and a detector array with N+L−1=4194 elements. This saves approximately 4000 elements for the detector array compared to the number of detector elements required to measure a spectrum with length L=4095. Since it is often known that only the first channels of the spectrum contain any signal, this may represent a drastic saving for the detector without sacrificing information.

Of course, the length L of the spectrum may be chosen to be equal to N, as done in the time-of-flight pseudorandom approach.

Figure 8:
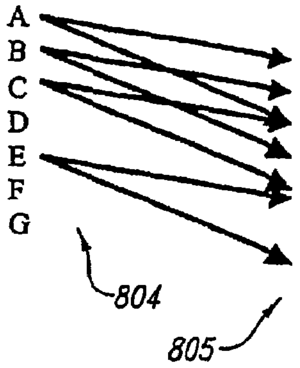
FIG. 8 shows a detailed example of the convolution of the spectrum occurring in the experiment (top) and the deconvolution of the detected signal (bottom) revealing the spectrum, particularly illustrating how adding the signal of detector elements N+1 to N+L to the signal of detector elements 1 to L creates the convoluted sequence.

FIG. 8 shows a detailed example of the mathematical procedure. The illustration shows the pseudorandom sequence 801 where 1's correspond to a source and 0's to a blank, the corresponding deconvolution sequence 802 and the spectrum 803. The illustration further schematically shows the operation of the sources (labeled A-G) according to the pseudorandom sequence at 804, and the resulting detection by the detectors (labeled #1 -#13) at 805. The illustration shows a graphical representation of the signals from the sources (i.e., active and non-active or blank) at 806 and the resulting detected signals at 807. The illustration further shows the convoluted sequence at 808, and the deconvolution sequence at 809 which results in the spectrum 811.

Since the mathematical procedure is independent of the particular type of analytical instrument, the spatially based pseudorandom approach can be effectively simulated using a computer model. This is particularly helpful to study the influence of various noise sources. Several examples for the simulation results are described below.

Figure 6:
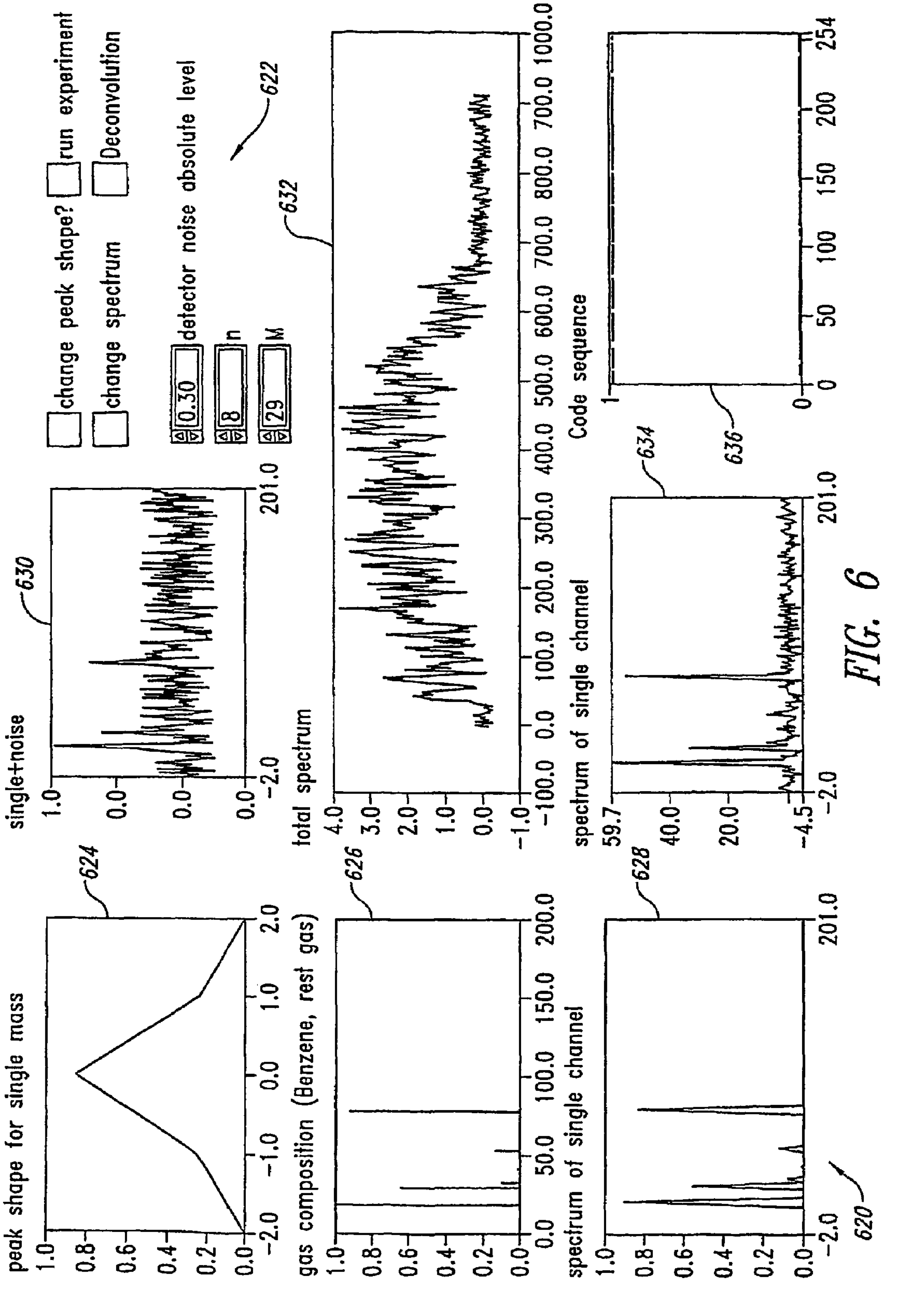
FIG. 6 is a schematic illustration of a computer implemented user interface showing a simulation tool to study the performance of pseudorandom source arrays under different noise conditions, where the software computes the detected spectrum of a single source from a given peak resolution function and the composition of the sample, then the detector signal for a pseudorandom source array is computed for a specified pseudorandom sequence, and a defined amount of detector noise is added, where deconvolution of the detector signal yields a spectrum with improved signal to noise ratio compared to the spectrum of a single channel plus the same amount of detector noise.

FIG. 6 shows a graphical user interface (GUI) 620 for use with an analytical device. The GUI 620 can be part of a user interface of a computing system 1319 (FIG. 13A) associated with, or forming a portion of, the analytical device. The GUI 620 may include a number of user selectable controls 622. As illustrated in FIG. 6, the GUI 620 displays the results of a simulated analysis of a sample gas. For example, the results can include a graph 624 plotting a peak shape for a single mass, a graph 626 plotting a gas composition, a graph

628 plotting a spectrum of a single channel, a graph 630 of a signal plus noise, a graph 632 plotting a total spectrum, a graph 634 plotting a spectrum of a single channel and/or a graph 636 plotting the code sequence. The GUI 620 may display other graphs and information (not shown), and/or may exclude some of the information illustrated. The output can additionally, or alternatively, be provided in other forms, such as paper copies.

The simulation, illustrated in FIG. 6, confirms the expected benefits of the pseudorandom method: the signal-to-noise ratio is improving as the number of channels increases. An important finding is that the improvement in signal to noise ratio is not proportional to the number of source elements, since the noise of the N+L detector elements is redistributed into each of the channels of the spectrum by the deconvolution procedure. The noise per channel in the spectrum therefore increases by a factor of $(N+L)^{1/2}$ compared to the noise in a spectrum channel if a single source is used. The resulting increase in the signal to noise ratio due to the pseudorandom method is therefore $$\frac{S\text{-to-}N(Pseudorandom)}{S\text{-to-}N(Singlesourse)} = \frac{1}{2}\sqrt{\frac{N}{1+L/N}} \quad \text{with} \quad N > L \gg 1.$$

For a typical length of a spectrum of L=500 and a pseudorandom sequence length of N=1023, the signal to noise ratio is improved by a factor of 13.

The price for this dramatic improvement of the signal-to-noise ratio is that a source array with reasonably low variations between source elements has to be designed. The other drawback of the pseudorandom method, which has been discussed in detail for applications in the time domain, is the redistribution of noise in certain channels of the spectrum (e.g., source noise, which is proportional to peak height) over the whole spectrum during the deconvolution process. This may reduce the signal-to-noise ratio for the detection of trace components of the sample.

In the following, the application of the pseudorandom approach is discussed for two specific analytical instruments, relying on spatial separation of the sample or the probe particles/waves: i) a micro-machined mass spectrometer, and ii) an optical monochromator. Finally, further possible applications of the pseudorandom method for instruments using spatial separation are discussed.

A Micro-Machined Mass Spectrometer

The Lorenz force, the force acting on a charged particle in a magnetic field can be used to separate particles according to their energy×charge/mass product. If the energy is fixed, e.g., through an electrostatic energy filter, the molecular weight of a particle can be determined. Magnetic based mass spectrometers have been developed since 1930, and a very high level of sophistication has been achieved for both commercial and research instruments.

It is extremely desirable to build a very small, portable MS unit (e.g., the size of a cigarette box) for in-situ monitoring of environmental conditions, as well as other applications. This goal has so far not been achieved because of scaling laws effecting both magnetic as well as quadrupole based ion separators. Down-scaling of the units needs to include ionizer volume, flight path and detector units. Very small ionizer volumes do not generate the ion currents needed to provide reasonable sensitivity.

For example, in magnetic double focusing Mattauch Herzog MS units (the "normal magnetic based MS lay-out") the resolution of the system is inversely proportional to the sum of ionizer and detector opening. Therefore, to scale a conventional MS-system down to a very small unit—with resolution M/ΔM of 1 or better—one must use very small ionizer openings which will lead to unrealistically low ion currents for most applications.

Mass Spectrometer Embodiment

In one embodiment, a mass spectrometer ("MS") embodies an assembly of (i) N ion sources, (ii) a mass separator and (iii) a detector array. The detector array has m*(N+L−1) units (m=1, 2, 4) depending on the overall MS lay-out, where L is the length of the mass spectrum (L<=N). A first embodiment takes the form of a non-scanning mass spectrometer, while a second embodiment takes the form of a scanning system. The MS has N=2n−1 subunits where n is an integer. The source array consists of emitting and non-emitting units, arranged in the so-called pseudorandom sequence. The non-emitting units may take the form of sources rendered temporarily or permanently incapable of emitting, or of blanks (i.e., space holders incapable of emitting in any situation). The source array can be made planar-linear, as illustrated in FIG. 5, but is not limited to this layout.

The detector can be any position sensitive particle detector, its effective spatial resolution is the same as the elementary size of the source array. (Here effective means several sub-units of the detector can be grouped together to realize the dimensions of the pseudorandom sequence elementary step size of the ion-source array.)

Figure 9:
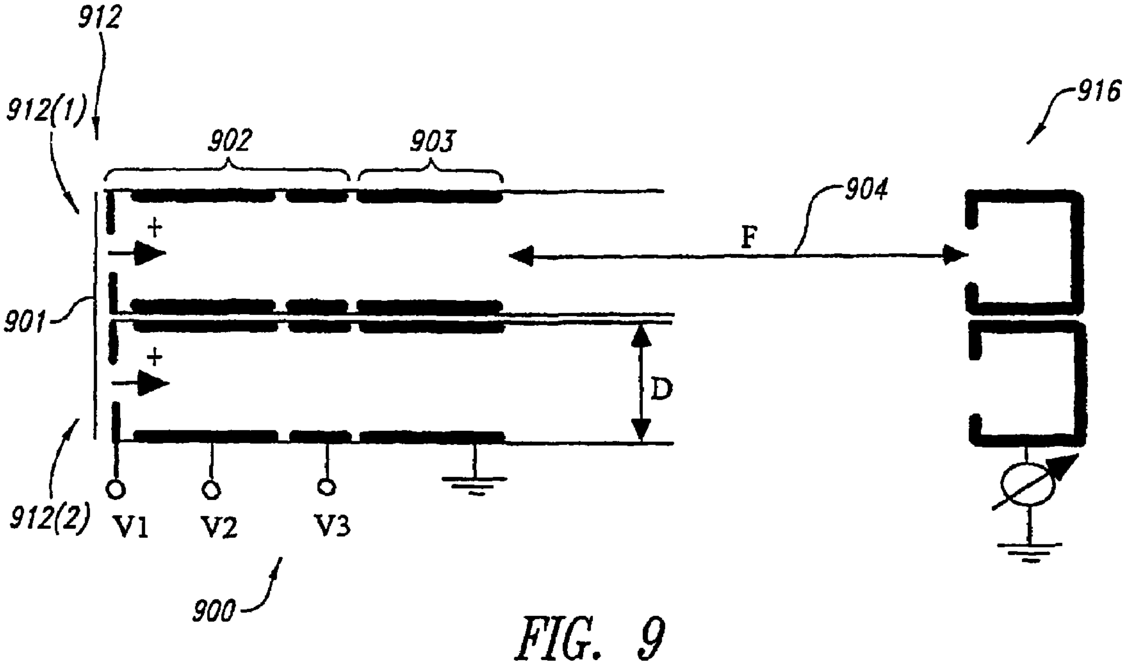
FIG. 9 is a schematic diagram of a exemplary design of the ion optics employing an asymmetric lens which is placed in front of the source and focuses the beam onto the detector array placed in the distance F.

A Pseudo Random Based Non-Scanning Mass Spectrometer:

FIG. 9 shows an elementary unit 900 useful in building an MS-system. The elementary unit 900 includes: a source array 912 of ion sources 912(1), 912(2) (only two ion sources are shown for the sake of clarity of illustration). The ion sources 912(1), 912(2) include an ionizer 901 and extractor optics 902. The elementary unit 900 may also include a mass separator 903 positioned along a flight path 904, and may further include focusing elements (not shown). The elementary unit 900 may further include a detector array 916. The ions are formed in the ionizer 901, accelerated in the extractor 902, focused, mass separated, and detected with the position sensitive particle detector 916.

Figure 10:
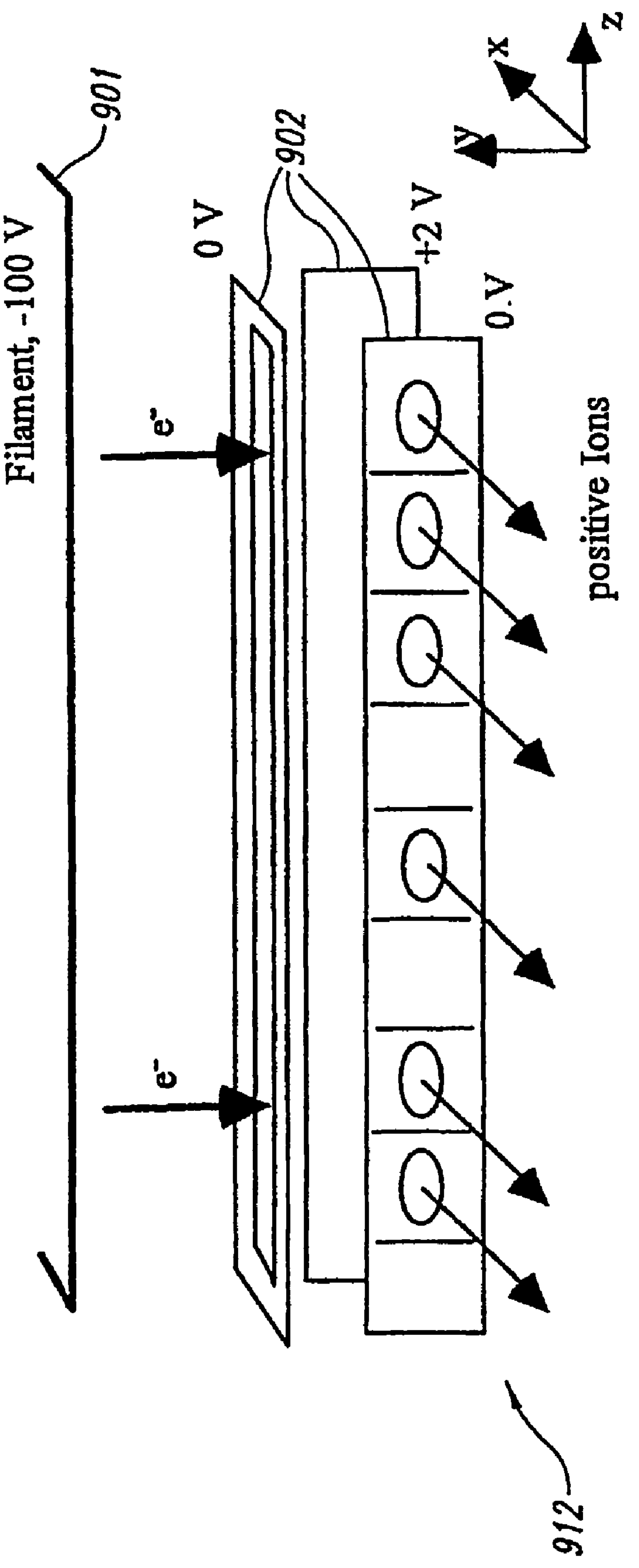
FIG. 10 is a schematic diagram illustrating an ion source array of 9 cells, emitting in the sequence 011010111.

In one embodiment of a non-scanning mass spectrometer, a series of the ion sources 912(1)-**912(*n*) are placed beside each other, in a chain-like array together with blank or inactive units. For example, FIG. 10 shows how a system of single units can be arranged to act as a single instrument. As illustrated therein, the resulting source array 912 emits its ions to the detector array 916 (FIG. 9). The "blank" units have the same physical width as the sources, but they do not emit ions, as further illustrated in FIG. 10. The cost associated with the manufacturing or provision of the blank units may be negligible with respect to the costs associated with the sources. Thus, the use of simple blank spacing structures instead of more complicated source structures that are actually capable of emitting but which are temporarily or permanently rendered inactive, may provide a distinct commercial advantage. Alternatively, under some manufacturing scenarios, it may prove less costly to uniformly manufacturer the source array 912, and to disable certain ones of the sources to create blanks via physical modifications or firmware/software means. The exact position of the blanks and emitting sources is defined by the pseudorandom sequence. The mass spectrum of the average ion beam hitting the detector 916 can be extracted by unfolding the detector signal with the pseudorandom sequence of the source array 912** as described above.

The ionizer 901 can be based on any conventional ionization method such as electron impact, field ionization or photo ionization. However a vacuum insensitive method, such as field ionization may be preferred, since the system will not necessarily need to operate in high vacuum conditions (see below).

The extractor 902 may be a system of ion optic steering plates and ion optic parts, which can be micro-machined. The opening of a single unit may be on the order of a few micrometer.

The flight path 904 will have a length of 0.1-5 cm depending on resolution and mass range desired for the instrument. Therefore vacuum requirements to guarantee a collision free motion while traversing the flight path will allow the use of a mechanical vacuum pump only, instead of a mechanical pump/HV-pump unit as used in current systems.

The different mass/charge ratios are separated in a magnetic field. Depending on the source-detector arrangement the ions perform a 180° turn (Dempster Arrangement) or, as indicated in the arrangement illustrated in FIG. 10, a smaller angle.

The detector 916 can be any position sensitive particle detector. Its resolution defines the elementary size of the source array 912. However, several detector units can represent a basic unit in the pseudorandom arrangement.

A Pseudorandom Based Scanning Mass Spectrometer

The instrument, if equipped with an electromagnet may be able to perform in both a scanning and a non-scanning mode. In the non-scanning mode the signals from all detector channels are deconvoluted and transformed into a mass spectrum with L channels. Ion energy and magnetic field strength are constant in this mode. In the scanning mode, however, the deconvolution is performed in such a manner, that the contributions of all pairs of a specific ion-source-detector channel relationship are evaluated. Therefore, by scanning the magnetic field strength we map out the mass spectrum. The later approach has the advantage that the scanning mode can utilize the highest resolving part in the mass spectrum to map out the entire accessible mass range. It should be noted that, since (1) the radius of the curved ion path in the magnetic field is proportional to the square-root of the molecular weight/charge ratio and (2) the length of the flight path from the source to the detector is dependant on the molecular weight as well, we expect that the resolution of the instrument will not be constant over the entire range.

Dimensions of a Micro-Machined Mass Spectrometer

Figure 11:
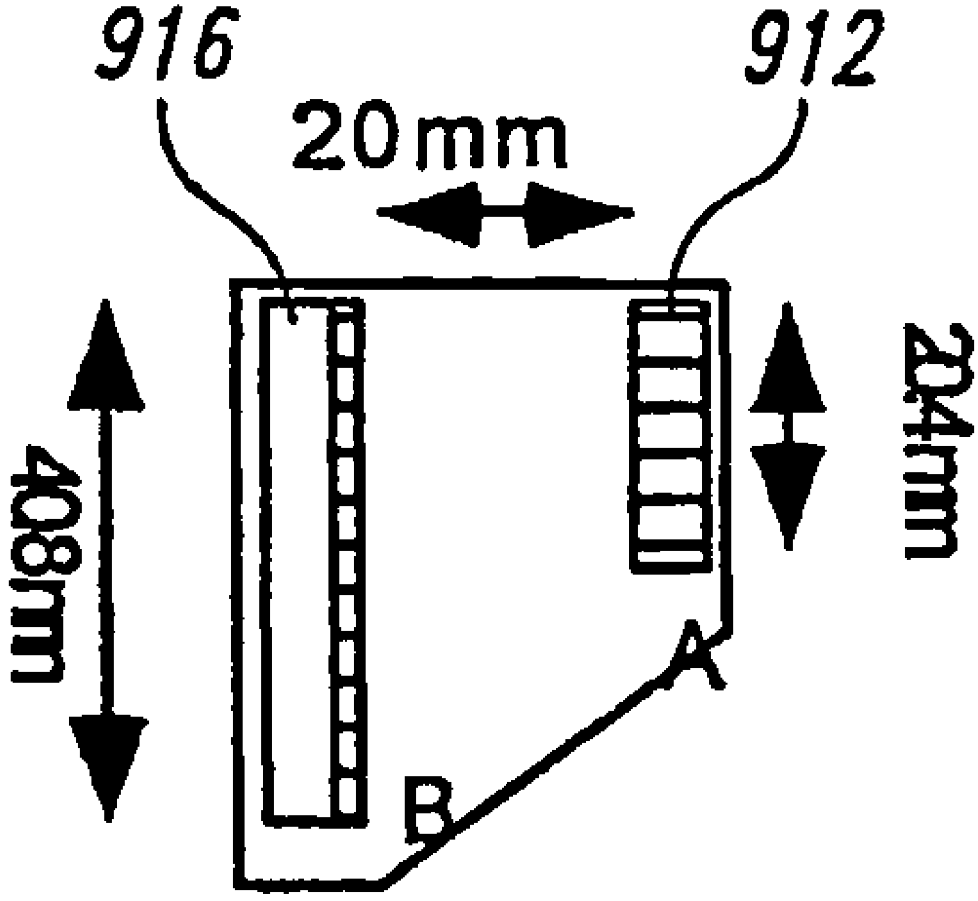
FIG. 11 is a schematic diagram of an exemplary lay-out of the micro-machined mass spectrometer using pseudo random array technology, where as the ions leave the emitter array, their trajectories are bent in the magnet field, and are detected with a position sensitive detector, and particularly illustrating realistic magnetic field strength, ion energy, commercially available detector arrays, and state of the art micro machining technology, where the overall dimensions of the apparatus (20 mm×40 mm×3 mm) show the promising potential of the pseudorandom array technology for developing a truly portable mass spectrometer.

FIG. 11 shows some suitable dimensions for one embodiment of the MS system described above. Those skilled in the art may recognize that other dimensions may prove suitable for the above MS system or other MS systems. The envisioned pseudorandom chopping technique can be applied to any system with $N=2n-1$ ion-source units and at least $N+L-1$ detector units. So it could be used for large MS-units, such as the currently developed Compact Mass Spectrometer, to gain extremely high sensitivity, or it could be scaled to small dimensions to build a micro-machined, handheld MS.

Example for the Dimensions of a Scanning Instrument with an Electro Magnet

Desired mass range: 0-200 Dalton

Given spatial detector resolution: 20 μm

Mass resolution: $\Delta M/M>1@200$ D (desired) $\Delta M/M\geqq 2@100$ D $\Delta M/M\geqq 12@50$ D Pseudorandom Sequence Number N=1023

Distance Detector−Emitter=20 mm

Bmax (for 200 D measurement)=6000 Gauss

Ion energy: 100 eV 1023 emitter units spaced 20 μm apart=>

Emitter Length=20.4 mm

Detector Array: Length=40.8 mm (2N elements×Spatial Resolution of 20 μm)

Possible Advantages of the M3S System (1) High sensitivity due to a large total emitter size.

(2) Very small: Size of a small shoebox including all vacuum pumps.

(3) Vacuum requirements: 10-3 Torr or better.

(4) Truly portable, since no radio-frequency source as in quadrupole MS, or DC-voltage for an electromagnet as in most Mattauch-Herzog MS is required if a permanent magnet is used.

(5) Mass range is at least to 200 D and may be higher.

A Pseudorandom Optical Monochromator in Czerny-Turner Configuration

Optical monochromators are widely used to analyze the spectral composition of light emitted from a sample or transmitted through a sample. The spectral composition, simply called the optical spectrum, is often characteristic for the chemical composition of the sample or chemical processes occurring in the sample. In other cases it is important to obtain a detailed characterization of a light wave, which may e.g., be transmitted through a fiber optics cable used for telecommunications.

The optical spectrum may consist of a set of discrete wavelengths (a line spectrum), characteristic of emission from gases, or broad peaks, as for dyes.

Many applications in optical spectroscopy are limited by insufficient signal-to-noise ratio. This may be due to very weak light sources, such as distant stars in astronomy or a limited number of radiating atoms in physical chemistry. However, often the low sensitivity of photon detectors is responsible for decreasing the signal-to-noise ratio, an effect which is especially pronounced in the infrared region of the spectrum.

Fourier-transform spectroscopy is a multiplexing technique, which can be used to improve signal-to-noise ratio, and it is widely used for infrared spectroscopy. Fourier-transform spectrometers tend to be very expensive and are not very common.

Figure 1A:
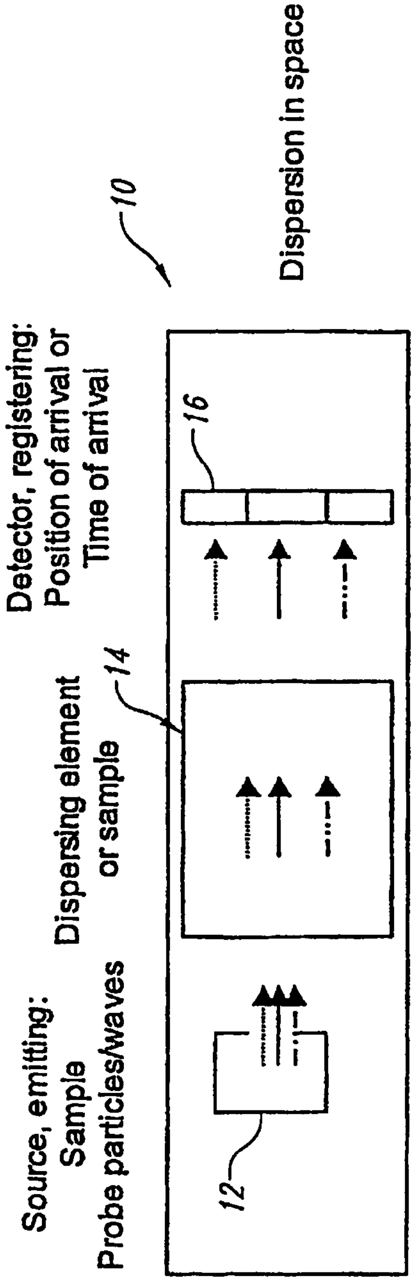
FIG. 1A (Prior Art)
FIG. 1A is a schematic diagram showing the fundamental components employed in conventional space domain based analytical systems.
Figure 1B:
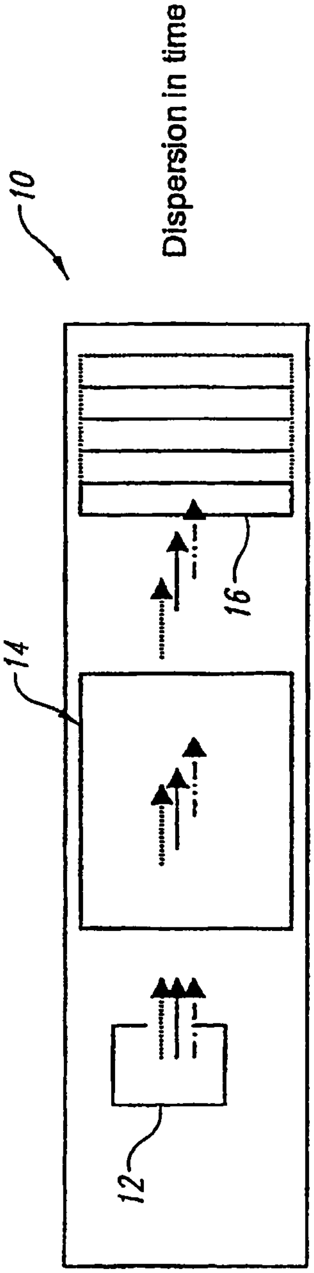
FIG. 1B (Prior Art)
FIG. 1B is a schematic diagram showing the fundamental components employed in conventional time domain based analytical systems.
Figure 2A:
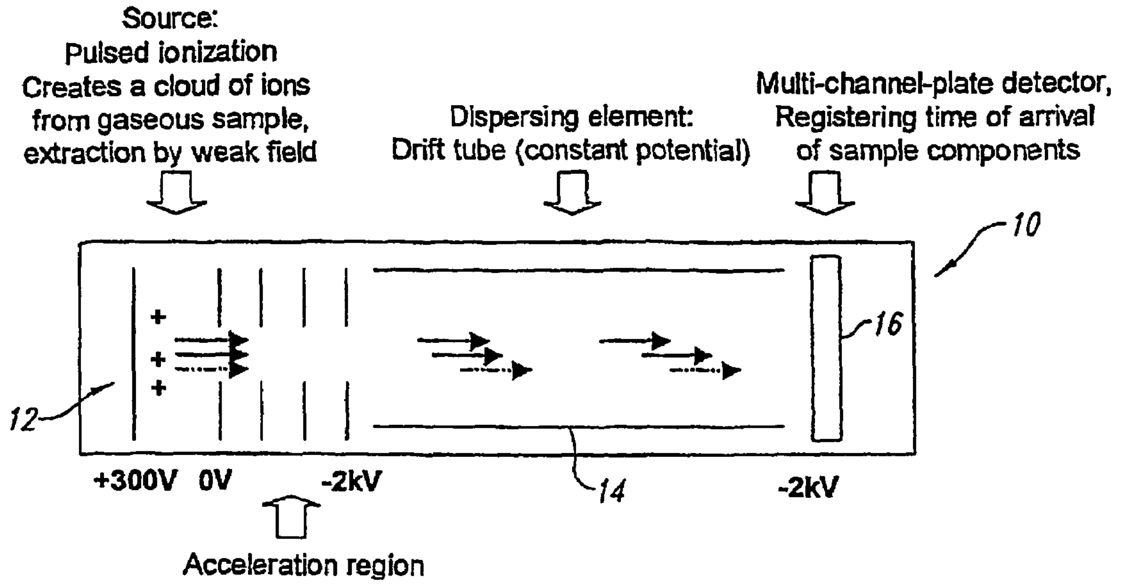
FIG. 2A (Prior Art)
FIG. 2A is a schematic diagram of a conventional Wiley-McLaren time-of-flight mass spectrometer.
Figure 2B:
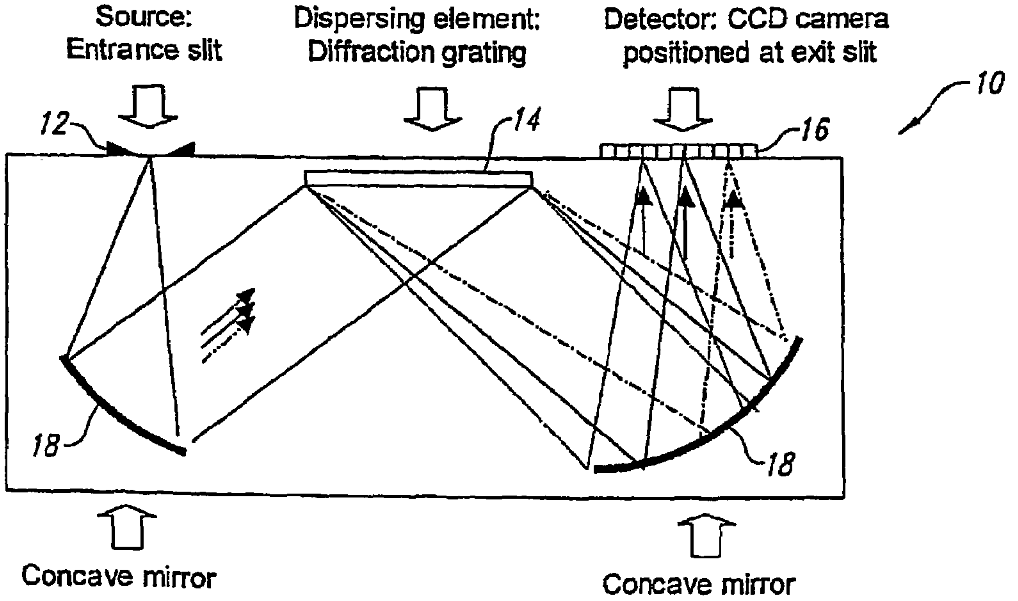
FIG. 2B (Prior Art)
FIG. 2B is a schematic diagram of a conventional Czerny-Turner optical monochromator.

The workhorse of optical spectroscopy is the optical monochromator in Czerny-Turner configuration, illustrated in FIG. 2B. In this instrument, the light enters through an adjustable entrance slit and falls onto a concave mirror, which reflects the light in a parallel bundle. The bundle of light is then reflected under a wavelength-dependent angle by a planar diffraction grating onto a second concave mirror. The second mirror focuses the light bundles—each with a different wavelength—into the plane of the exit slit, while converting the different angles of incidence of the parallel bundles into a series of adjacent focal points in the plane of the exit slit. If a position-sensitive light detector such as a CCD camera replaces the exit slit, this series of illuminated points with different brightness can be detected simultaneously and constitutes the optical spectrum of the incoming light.

Traditionally, the sensitivity of this optical monochromator depends on the amount of light which can enter the instrument. Opening the entrance slit, which proportionally reduces the resolution, can increase light intensity. Alternatively, the optical aperture of the instrument can be increased by using larger mirrors and gratings, drastically increasing the cost of components. In addition, light sources with a large emitting surface often cannot be matched properly to a large aperture monochromator.

Figure 13:
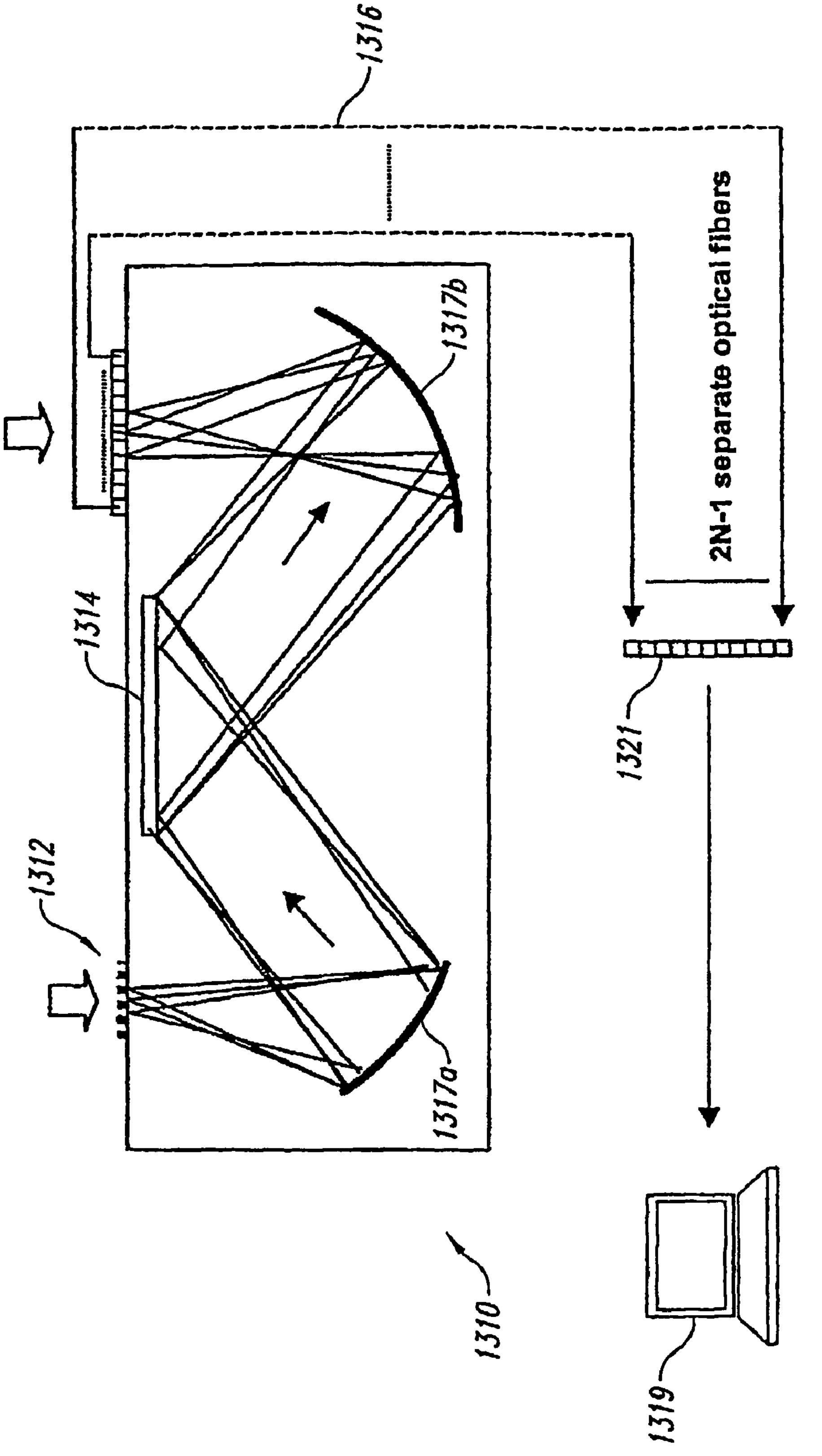
FIG. 13 is a schematic diagram of an exemplary pseudorandom monochromator used as encoding device for optical communication lines.

Many applications require as much light as possible at the detector, and the monochromator creates a bottleneck. As illustrated in FIG. 13, by using a pseudorandom array of entrance slits, the amount of light entering the monochromator can be increased by a factor of ~N/2, where N is the length of the pseudorandom sequence. This leads to an increase of the signal-to-noise ratio of 1-2 orders of magnitude.

Figure 12A:
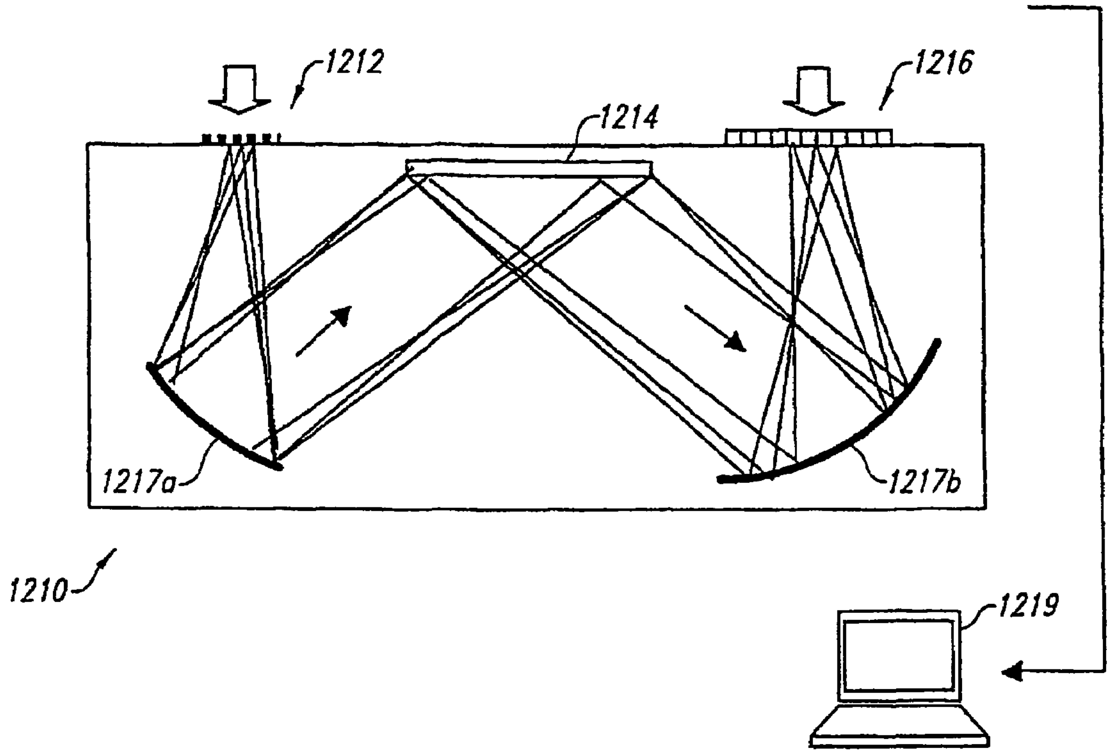
FIG. 12A is a schematic diagram of an exemplary pseudorandom optical monochromator in Czerny-Turner configuration, where light enters through a pseudorandom array of entrance slits and is dispersed by the grating, the spectra of each single slit overlapping on the detector and where the spectrum can then be computed with improved signal-to-noise ratio using the deconvolution procedure described above.

FIG. 12A shows one illustrated embodiment of a pseudorandom monochromator 1210 combining the classic setup of the Czerny-Turner monochromator with a pseudorandom array of entrance slits 1212 and a light detector array 1226 with a sufficient number of elements. In the array of entrance slits 1212, the 1's of the pseudorandom sequence are represented by slits with fixed width and the 0's of the pseudorandom sequence are blank elements (with zero light transmission). The distance between adjacent elements is chosen so that the light originating from them is shifted by an integer number of detector elements, when it falls onto the detector. Preferentially, the light from directly adjacent slits is shifted by one detector element (e.g., one pixel for a CCD camera).

The detector array 1216 has to have at least N+L−1 elements, with N=length of the pseudorandom sequence, and L=length of the spectrum. However, since most CCD's have a number of lines which is a power of 2 ( . . . , 512, 1024, . . . ) in most cases it will be convenient to choose L to be equal to N, since no savings will be made in detector cost by restricting L to a smaller number.

The pseudorandom monochromator 1210 includes a diffraction grating 1214 as the dispersing element. The pseudorandom monochromator 1210 may also include a first mirror 1217*a* for directing light from the source array 1212 to the grating 1214, and a second concave mirror 1217*b* for directing light from the grating 1214 to the detector array 1216.

A computing system 1219 receives the output of the detector array 1216, and executes a deconvolution algorithm to determine the spectrum, and to display results as generally discussed above.

Figure 12B:
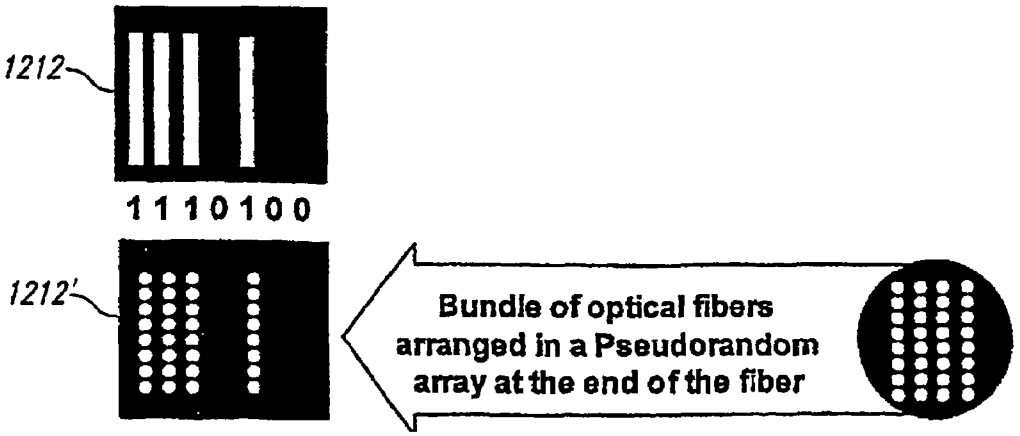
FIG. 12B is a schematic diagram of substitution of an optical fiber bundle for the slit array of FIG. 12A.

FIG. 12B illustrates a substitution of an optical fiber bundle 1212' for the slit array 1212. The substitution is suitable for an alternative embodiment in which light reaches the monochromator 1210 through the optical fiber bundle 1212' where the fiber-ends of the optical fibers can be arranged in a pseudorandom sequence, eliminating the need for a special slit array.

Example for the Dimensions of a Pseudorandom Monochromator

Commercially available detector: Cooled CCD with 512×512 pixels, pixel size 24 μm×24 μm, 256 gray levels (8 bit).

Pseudorandom sequence: N=255, length of spectrum L=N

Entrance slit array: 255 slits and blanks, slit height 10 mm, slit width 15 μm, array dimensions 6.12 mm×10 mm Grating and mirrors: Concave mirrors—diameter 100 mm, focal length 150 mm, ruled grating —300 lines/mm, 50 mm×50 mm linear dimensions Improvement in signal-to-noise ratio: ~6-fold Instrument can be converted into classical, single-slit monochromator merely by replacing the slit array with a single slit. Those skilled in the art may recognize other dimensions which are suitable for a pseudorandom monochromator.

Applications for a pseudorandom monochromator (I) Enhancing the Performance of Monochromators in Traditional Applications:

To appreciate the gain in signal-to-noise ratio due to the pseudorandom spatial approach, one has to consider that the widely applied method of cooling the detector with Peltier elements to approximately 220 K results in only a 4-fold reduction of the detector noise. The pseudorandom slit array could therefore replace the more complicated, and error-prone cooling of the detector.

A typical defect of CCD detector arrays is the occurrence of defect or "hot" pixels. The extent of this defect is typically classified by grading the CCD array as grade I, II, III or IV, with drastically different prices. Since the pseudorandom spatial approach averages the impact of defect detector elements over the whole spectrum, savings in system cost may be possible by replacing a higher grade CCD array with a lower grade CCD array, affecting the deconvoluted spectrum to an unnoticeable extent.

For these reasons, the pseudorandom technique may find an application in all Czerny-Turner monochromator systems, regardless of their specialized application area.

(II) Serving as Cryptographic Coding Device for Distributed Transmission of Optical Signals:

FIG. 13 shows cryptographic coding device 1310 in which the detector array 1216 (FIGS. 12A and 12B) is replaced by a bundle of optical fibers 1316, where each fiber opening takes the place of a detector element. The cryptographic coding device 1310 is capable of secure transmission of optical signals.

In this device, a stream of light pulses of multiple wavelengths, carrying the unscrambled information, enters the monochromator through the pseudorandom array of entrance slits 1312. The grating 1314 reflects different wavelengths under different angles, which leads to a scrambling of the signal in the plane of the exit slit, where now the linear bundle of 2N−1 optical fibers 1316 is situated. The light entering the optical fibers 1316 is now a new mixture of light pulses at different wavelengths. A first concave mirrors 1317*a* may reflect the light from the pseudorandom array of entrance slits 1312 to the grating 1314, while a concave mirror 1317*b* may reflect the light from the grating to the optical fibers 1316. The above system may employ a position sensitive sensor 1321 with 2N−1 elements as an interface between the optical fibers 1316 and a computing system 1319.

If the intensity of the incoming light is chosen appropriately low, the signal obtained by detecting the output from just one fiber can be small enough to prevent interception of the original stream of light pulses. Only the detection of a large number of the fiber outputs and the application of the pseudorandom deconvolution procedure would allow a reconstruction of the entering stream of light pulses. If measures are taken to prevent the simultaneous interception of multiple fiber-optical communication channels, this setup enhances the security of optical communication lines.

Further Areas of Application for the Pseudorandom Array of Sources

Analytical Instruments Using Sound as Probe Waves

A variety of analytical instruments, ranging from medical ultrasound imagers to sonar systems, use sound at various frequencies as a probe wave. In these instruments a transducer emits the sound waves, which are then scattered by the imaged objects. The scattered/reflected waves are detected by an array of microphones measuring time-dependent amplitude and phase of the incoming waves. By employing a pseudorandom array of sound transducers and a corresponding array of microphones, the performance of these instruments can be enhanced in a manner similar to that described above.

Magnetic Resonance Imaging/Computer Tomography

The sample (e.g., the patient) is rotated with respect to the instrument and images at a defined number of angles are taken. If a pseudorandom source and detector array with cylindrical symmetry is used, such as that illustrated in FIGS. 7A and 7B, images at different angles can be acquired simultaneously.

Pseudorandom Arrays of Imaging Elements

Lenses or mirrors used for imaging are, in a wider sense, analytical instruments. The light emitted by the object enters the lens through the object-side aperture (corresponding to the source) and is projected by the lens or mirror onto the light-sensitive detector, such as a CCD camera. The optical aperture, determining how much light is accepted, increases with the size of the lens/mirror. However, as lens/mirror sizes increase, it becomes more difficult to fabricate them resulting in corresponding dramatic increases of cost. In contrast, the production of high quality miniaturized lenses/mirrors has intrinsic advantages.

Figure 14A:
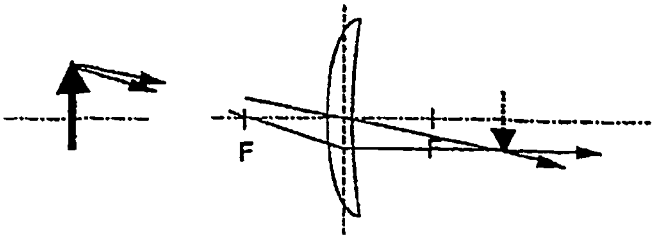
FIG. 14A (Prior Art)
FIGS. 14A-14F are schematic diagrams of lenses or mirrors used as an analytical instrument for optical imaging of distant objects.
Figure 14B:
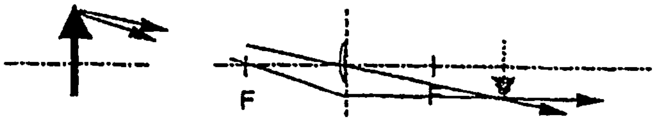
FIG. 14B (Prior Art)
Figure 14C:
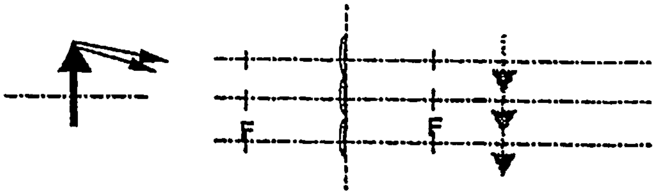
Figure 14D:
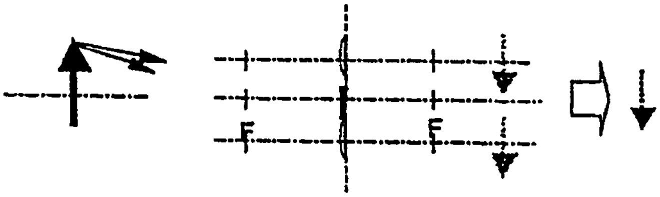

FIG. 14A shows a large lens or mirror 1412 with a correspondingly large aperture produces a bright image of an object on a detector. FIG. 14B shows that a single, miniaturized lens or mirror 1412 with a correspondingly small aperture produces a dim image of the object on a detector. FIG. 14C shows an array of miniaturized lenses or mirrors 1412 with correspondingly small apertures produces a large number of overlapping dim images of the object on a detector. FIG. 14D shows a pseudorandom array of miniaturized lenses or mirrors 1412 with corresponding small aperture produces a large number of overlapping dim image of the object on a detector. A deconvolution method can retrieve a single image with increased contrast.

Figure 14E:

FIG. 14E shows a linear pseudorandom array of miniature lenses or mirrors 1412 suitable for the embodiment of FIG. 14D. The linear array has the sequence 1110100, where 1 (shown as open circle), identifies a position having a lens or mirror and 0 (shown as black circles) identifies a position not occupied with a lens or mirror (i.e., blank). The diameter of the lenses corresponds to the dimensions of the detector elements.

Figure 14F:
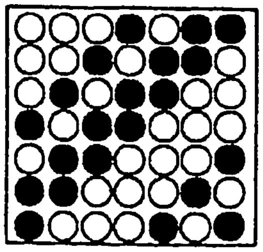

FIG. 14F shows a two dimensional array of miniature lenses or mirrors 1412 suitable for the embodiment of FIG. 14D. As illustrated, the two-dimensional array is a 7×7 array and has the sequence 1110100 with open circles=1 and black circles=0. The lines, as well as the rows, from pseudorandom sequence to allow deconvolution along the x-axis and the y-axis. The diameter of the lenses or mirrors correspond to the dimensions of the detector elements.

The pseudorandom array of miniaturized lenses or mirrors 1412 can be used to compensate for the loss in optical aperture, if the imaging involves only objects far away from the lens array (object distance>>array dimensions). In this case the lateral shift in position from lens to lens corresponds to a lateral shift of the identical image on the detector. The distance between elements on the lens/mirror array has to match the distance between detector elements.

FIGS. 15A-15F show a computer implemented graphical user interface of a simulation tool for simulating the analytical instrument according to various embodiments of the pseudorandom source arrays FIGS. 15A-15E are similar to FIG. 6, and like elements share the same reference numerals.

Figure 15A:
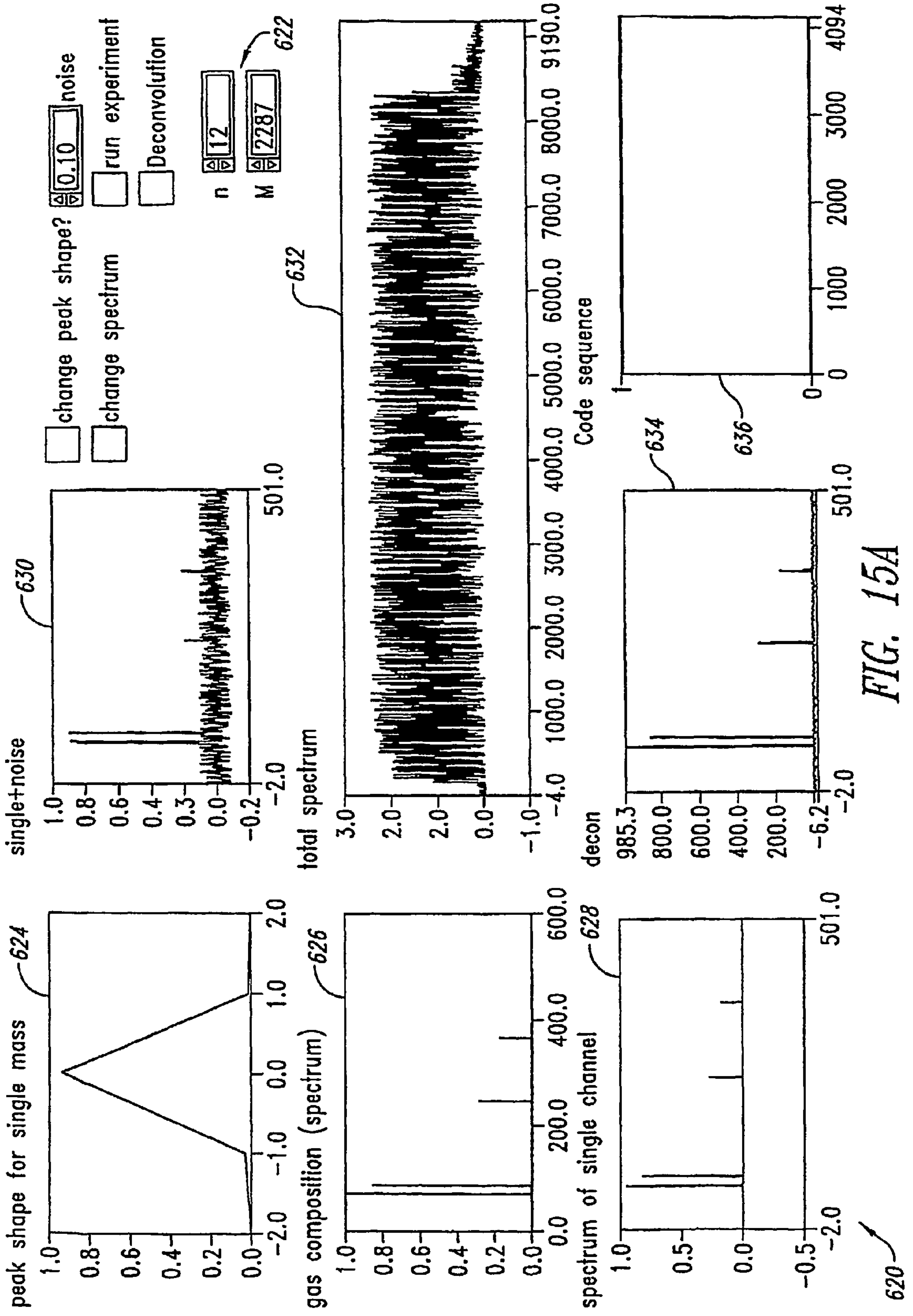
FIGS. 15A-15F are schematic illustrations of a computer implemented user interface of a simulation tool to study the performance of pseudorandom source arrays under a variety of conditions.

FIG. 15A shows the simulated graphical user interface 620 for an analytic instrument having a sequence length of 4095, a S/N(single emitter) equal to 10, and a S/N(emitter array) equal to approximately 500, including results for a hypothetical gas. The user selectable controls 622 show the noise level, the 2n−1 length of the pseudorandom sequence, and the seed value for the pseudorandom sequence generator. The graph 624 shows the peak shape as defined by the spectrometer resolution, while the graph 626 shows the (hypothetical) gas composition. These may be combined to produce the mass spectrum at the detector from a single emitter, discounting detector noise, as shown in the graph 628. The graph 630 shows the mass spectrum at the detector including detector noise for the hypothetical gas. The graph 632 shows the signal from the detector array including the detector noise. The graph 634 shows the mass spectrum after deconvolution. A graph 636 shows the pseudorandom sequence.

Figure 15B:
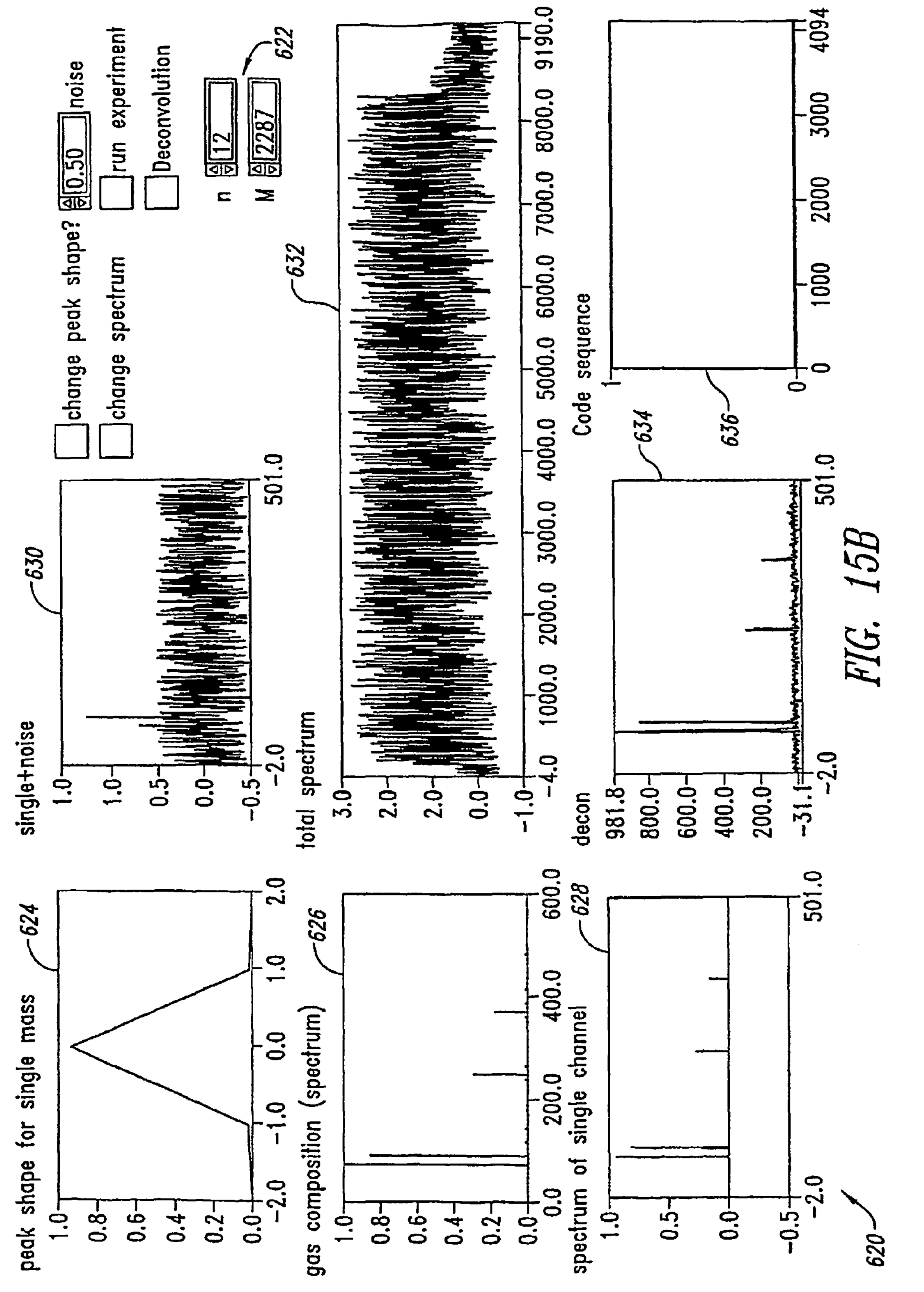

FIG. 15B shows the simulated graphical user interface 620 for an analytic instrument having a sequence length of 4095, S/N(single emitter)=2, S/N(emitter array) equal to approximately 100, including results for a hypothetical gas.

Figure 15C:
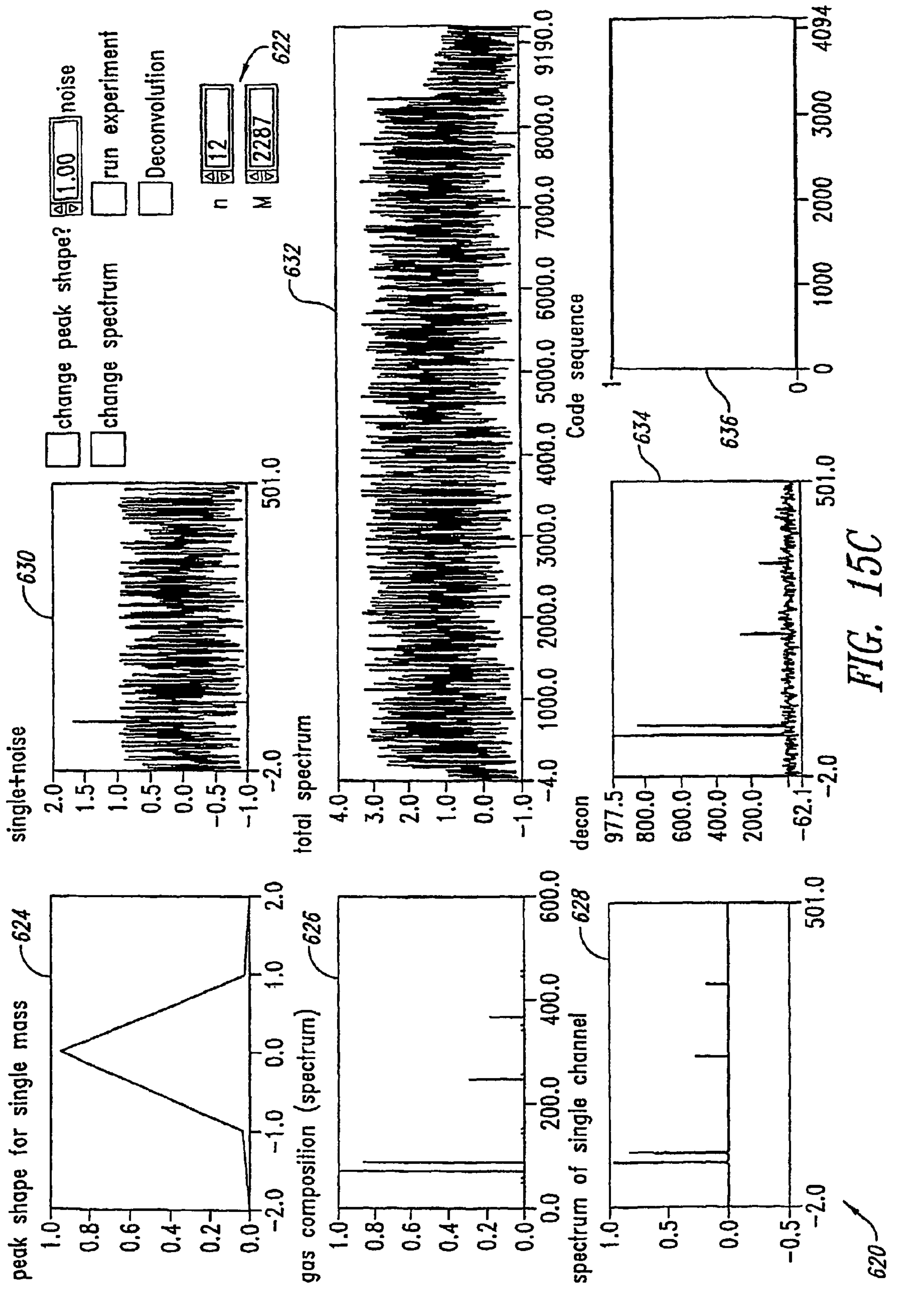

FIG. 15C shows the simulated graphical user interface 620 for an analytic instrument having a sequence length of 4095, S/N(single emitter)=1, S/N(emitter array) equal to approximately 50, including results for a hypothetical gas.

Figure 15D:
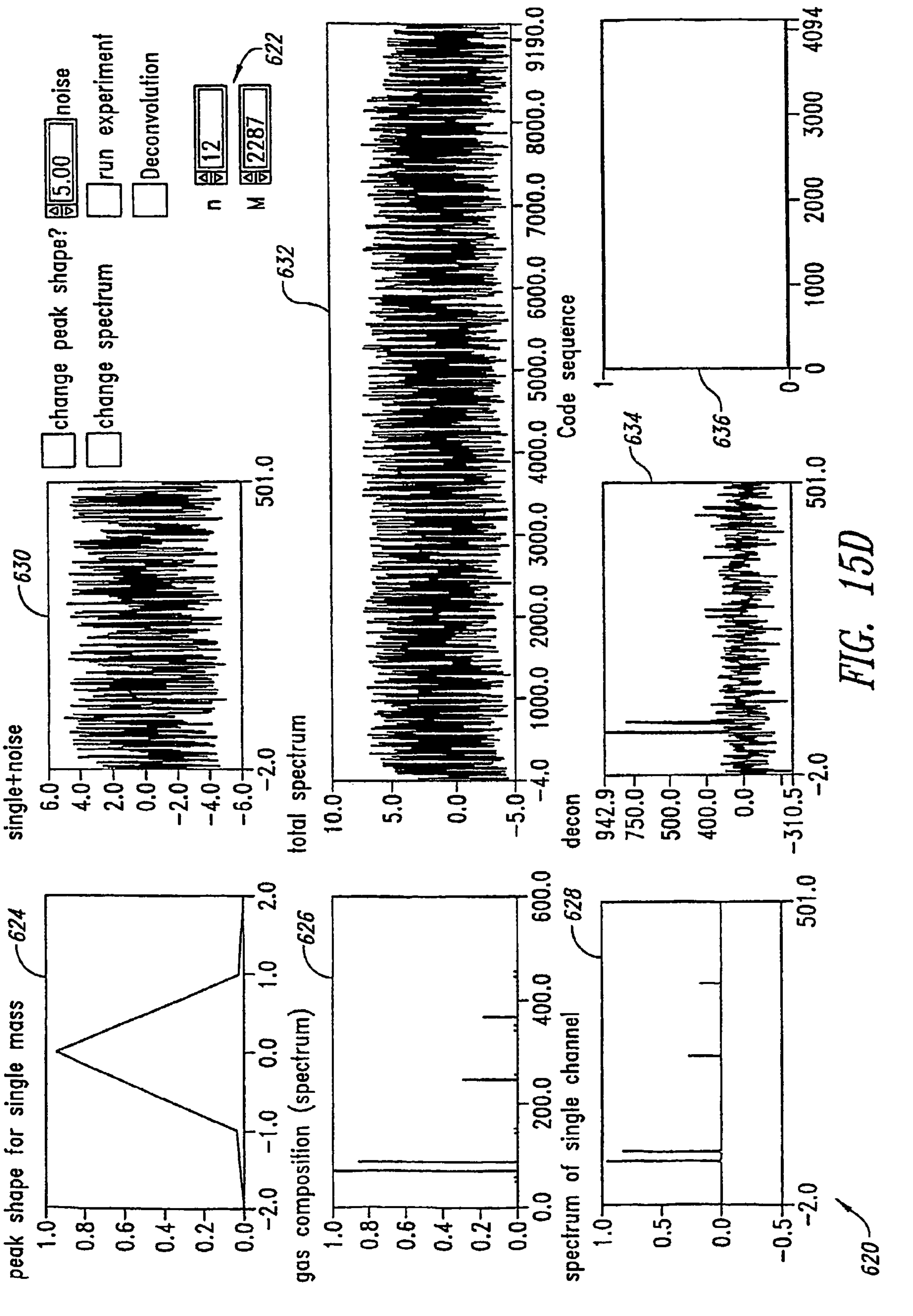

FIG. 15D shows the simulated graphical user interface 620 for an analytic instrument having a sequence length of 4095, S/N(single emitter)=0.2, S/N(emitter array) equal to approximately 10, including results for a hypothetical gas.

Figure 15E:
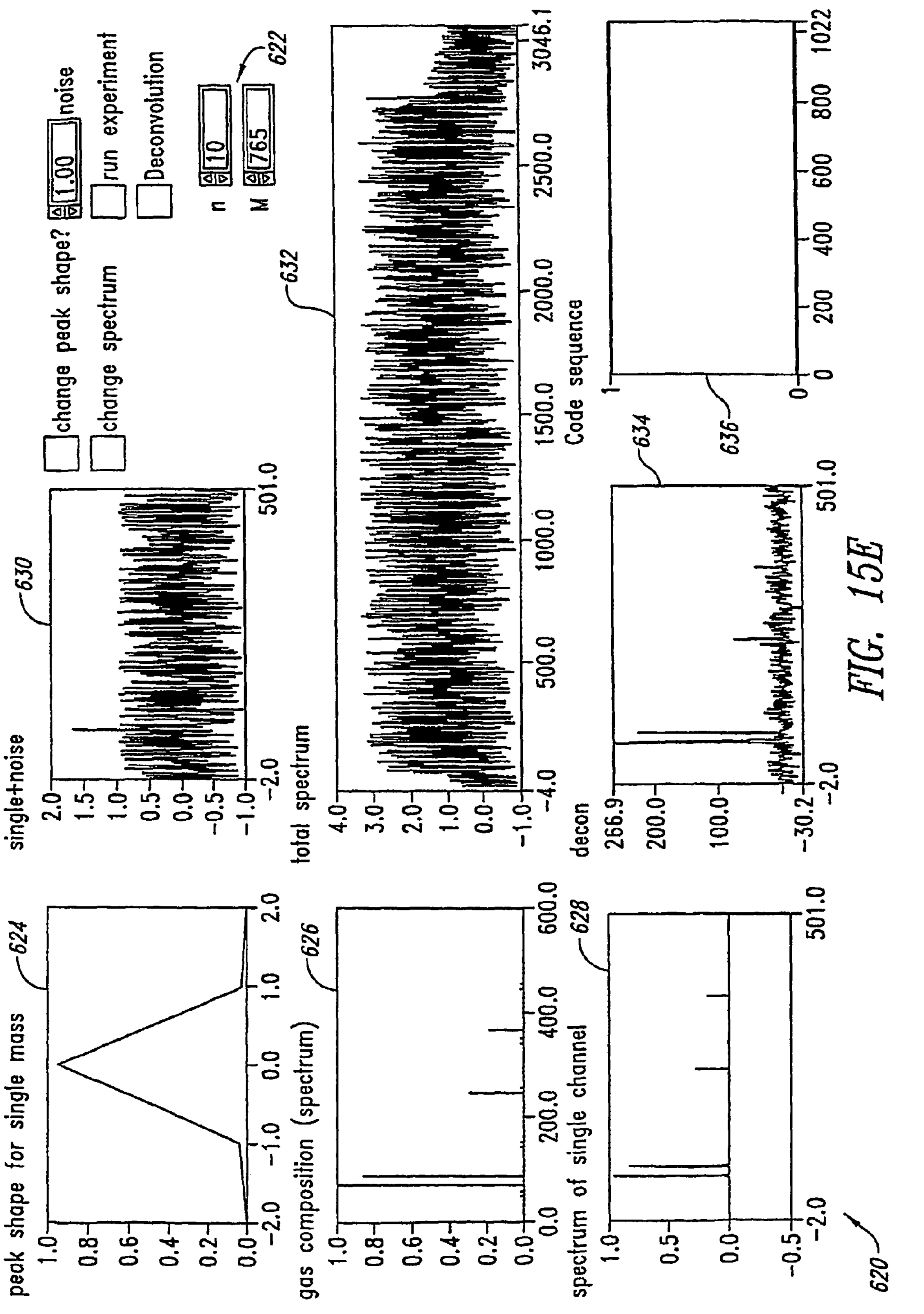

FIG. 15E shows the simulated graphical user interface 620 for an analytic instrument having a sequence length of: 1023, S/N(single emitter)=1, S/N(emitter array) equal to approximately 20, including results for a hypothetical gas.

Figure 15F:
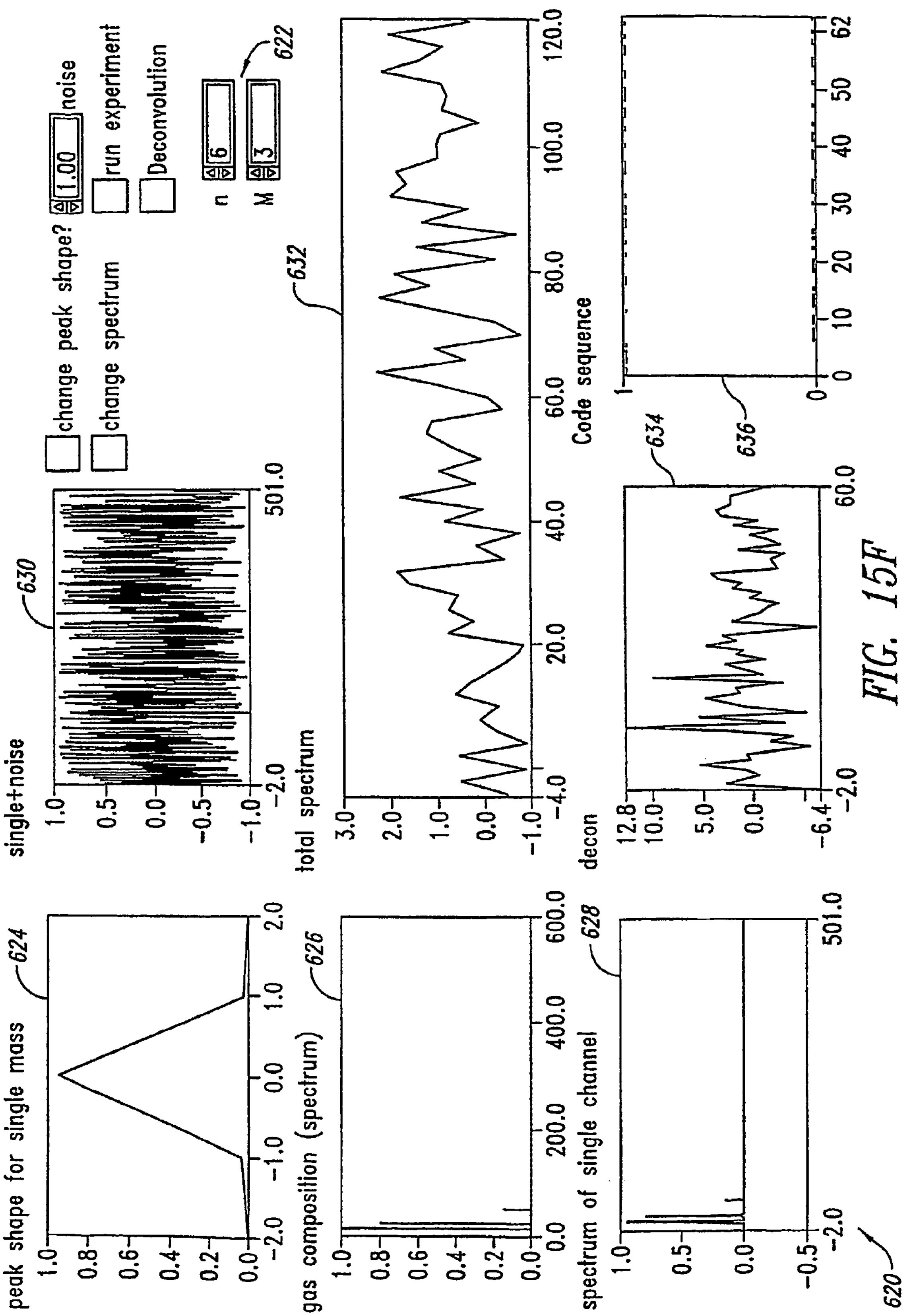

FIG. 15F shows the simulated graphical user interface 620 for an analytic instrument having a sequence length of 63, S/N(single emitter)=1, S/N(emitter array) equal to approximately 3, including results for a hypothetical gas.

FIGS. 15A-15F demonstrate that signal to noise (s/n) improvement due to the Pseudo Random Coding is proportional to the square root of the number of emitters (compared to single emitter).

The Deconvolution Procedure for a Pseudorandom Instrument Based on Spatial Separation Consider a source array $\{a_j\}$ with source elements ($a_j$=1) and blanks ($a_j$=0) arranged in a pseudorandom sequence with N elements ($0 \leqq j \leqq N-1$), ($a_j$=0 for j<0 and j>N). Assume the sample composition is characterized by the spectrum $\{f_k\}$ with $0 \leqq k \leqq L-1$, and $f_k$=0 for k<0 and k>L.

The detector signal $\{Z_d\}$ is given by the super-position of the signals from each source:

$$z_d = \sum_{i=0}^{d} a_j f_{d-j}$$

Therefore the last, non-zero detector element is the element with d=N+L−2, since then both, $a_j$ and $f_{d-j}$, can be non-zero ($a_{N-1}$ and $f_{(N+L-2)-(N-1)}=f_{L-1}$). Therefore the detector needs to have N+L−1 elements (0≦d≦N+L−2).

We define the modified signal sequence $\{Z'_m\}$ as:

$$z'_m + z_m + z_{m+n}$$

$$\text{with } 0 \le m \le N-1 \Rightarrow z'_m + z_m = \sum_{j=0}^{m} a_j f_{m-j} + \sum_{j=0}^{m+N} a_j f_{m-j+N}$$

$$\text{Since } f_{m-j+N} = 0 \text{ for } N + m - j > L \ (j < m - L + N)$$

$$z'_m = \sum_{j=0}^{m} a_j f_{m-j} + \sum_{j=N+m-L+1}^{m+N} a_j f_{m-j+N}$$

$$\text{and since } a_j = 0 \text{ for } j > N$$

$$z'_m = \sum_{j=0}^{m} ajfm - j + \underbrace{\sum_{j=N+m-L+1}^{N-1} ajfm - j + N}_{i = j-1}$$

$$z'_m = \sum^{m} a_j f_{m-j} + \sum^{-1} a_{j+N} f_{m-i}.$$

Now let $\{a_j\}$ be the periodic pseudorandom sequence associated with the source array sequence $\{a_j\}$ by $a'_j=a_j$ for 0<j<N−1 and fulfilling the periodic boundary condition $a'_{j+N}=a'_j$ Then we can write for $z'_m$:

$$z'_m = \sum_{j=0}^{m} a'_j f_{m-j} + \sum_{i=m+1-L}^{-1} a'_i f_{m-i}$$

$$z'_m = \sum_{j=m+1-L}^{m} a'_j f_{m-j}. \text{ for } 0 \le m \le L-1$$

which can be rewritten using $$\sum_{j=m+1-L}^{m} a'_j f_{m-j} = \sum_{m-i=m+1-L}^{0} a'_{m-i} f_i$$

$$j = m - i$$

$$= \sum_{i=0}^{L-1} a'_{m-i} f_i$$

$$\text{as } z'_m = \sum_{i=0}^{L-1} a'_{m-i} f_i$$

which is identical to expression (1) in (Zeppenfeld 1993), thus showing that the proposed arrangement of source and detector arrays gives the well-understood convolution of the single-source spectrum with pseudorandom sequence, if we properly construct $\{z'_m\}$ from the detector signal sequence $\{z_m\}$.

The above equation can be conveniently written as a matrix equation:

$$Z'_m = S_{mn} F_n \text{ with } S_{mn} = a'_{m-n}$$

The matrix $S_{mn}$ with N rows and L columns is therefore easily constructed from the periodic pseudorandom sequence $\{a'_j\}$.

The deconvolution procedure has to determine the spectrum F from the measured and modified signal Z' and the known matrix S.

While the N×L matrix S cannot be inverted, we can construct the modified spectrum F' with N elements by adding (N−L) rows of 0's to the vector F:

$$F' = \begin{pmatrix} f_0 \\ \vdots \\ f_L \\ 0 \\ \vdots \\ 0 \end{pmatrix}$$

Based on the assumption, that all sample components are contained in the first $L$ channels.

and the modified N×N matrix S' by defining $S'_{mn}=a'_{m-n}$ for m,n=0, 1, . . . , N−1

As comparison shows:

$$Z'_m = S'_{mn} F'_n$$

As discussed in (Brock 2000) the inverted matrix S'−1 can be easily constructed by setting $s'^{-1}_{jk}=-2/(N+1)$ if $S'_{jk}=0$ and $s'^{-1}_{jk}=2/(N+1)$ if $s_{jk}32$ 1, so that $$F'_n = S'{-1} \text{ nm } Z'_m$$

The spectrum $\{f_k\}$ with 0<k <L−1 corresponds to the first L−1 elements of the vector F'.

The convolution procedure therefore consists of 3 steps:

1. Construction of Z' from the detector signal sequence $\{Z_d\}$

2. Multiplication of Z' with the deconvolution matrix S'⁻1 to obtain F'

3. Truncation of F' after the first L elements to give the pseudorandom spectrum $\{f_k\}$ Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other systems and methods for analytical instruments, not necessarily the mass spectrometer and monochromator generally described above. The various embodiments described above can be combined to provide further embodiments. For example, the illustrated methods can be combined, or performed successively. The illustrated methods can omit some acts, can add other acts, and can execute the acts in a different order than that illustrated to achieve the advantages of the invention. The teachings of the applications, patents and publications referred to herein, including, but not limited to, U.S. provisional patent application Ser. Nos. 60/358,124, filed Feb. 20, 2002; 60/116,710, filed Jan. 22, 1999; and 60/061,394, filed Oct. 7, 1997, and U.S. nonprovisional patent application Ser. Nos. PCT/US98/21000, filed Oct. 6, 1998; PCT/US99/23307, filed Oct. 6, 1999; Ser. No. 09/325, 936, filed Jun. 4, 1999; and Ser. No. 09/44,360, filed Jan. 22, 2001, are incorporated by reference herein in their entirety.

These and other changes can be made to the invention in light of the above detailed description. In general, in the following claims, the terms used should not be construed to limit the invention to the specific embodiments disclosed in the specification, but should be construed to include all analytical instruments that operate in accordance with the claims. Accordingly, the invention is not limited by the disclosure, but instead its scope is to be determined entirely by the following claims.

The invention claimed is:

1. An analytical device comprising:

a source assembly comprising a plurality of sources, the sources spatially arrayed pseudo-randomly in at least a first dimension;

a detector assembly spaced from the source assembly, the detector assembly comprising a number of sensors sensitive to an output of the plurality of sources, and a dispersion element positioned in a path between at least one of the plurality of sources and at least one of the sensors to disperse the output of at least one of the plurality of sources, wherein the dispersion element comprises a magnetic assembly positioned to create a magnetic field in the path between at least one of the plurality of sources and at least one of the sensors to disperse the output of at least one of the plurality of sources.

2. The analytical system claim 1 in the form of a mass spectrometer wherein each of the plurality of sources is an ion emitter, and each sensor of the detector assembly is a Faraday cup.

3. An analytical system comprising:

a source assembly comprising a plurality of sources, the sources spatially arrayed pseudo-randomly in at least a first dimension;

a detector assembly spaced from the source assembly, the detector assembly comprising a number of sensors sensitive to an output of the plurality of sources; and a computer coupled to the detector assembly to receive detector signals therefrom corresponding to the output of the plurality of sources sensed by the number of sensors, the computer programmed to process the detector signals via a deconvolution algorithm, wherein the computer is programmed to process the detector signals via a deconvolution algorithm by:

constructing a detector signal matrix from the detector signals;

multiplying the detector signal matrix by a deconvolution matrix to produce a spectrum matrix; and truncating the spectrum matrix after the first L elements to produce a pseudorandom spectrum.

4. The analytical system of claim 3 in the form of a monochromator wherein the plurality of sources is an array of entrance slits, the dispersing element is a grating, and the detector assembly is an array of charge coupled devices.

5. The analytical device of claim 3 in the form of a computer aided tomography scanner wherein the plurality of sources are X-ray emitting sources, the dispersing element is a sample being analyzed, and the sensors of the detector assembly are X-ray detectors.

6. The analytical system of claim 3 in the form of a magnetic resonance imager wherein the plurality of sources are radio frequency emitters, the dispersing element is a sample being analyzed, and the sensors of the detector assembly are magnetic coils.

7. The analytical system of claim 3 in the form of a ultrasound machine wherein the plurality of sources are speakers, the dispersing element is a sample being analyzed, and the sensors of the detector assembly are ultrasonic transducers.

8. The analytical system of claim 3 wherein the number of sensors in the detector assembly is equal to N+L−1 where N is the number of sources and L is the length of a spectrum.

9. The analytical system of claim 3 in the form of a mass spectrometer wherein each of the plurality of sources is an ion emitter and each sensor of the detector assembly is a Faraday cup.

10. An analytical system comprising:

a source assembly comprising a plurality of sources, the sources spatially arrayed pseudo-randomly in at least a first dimension;

a detector assembly spaced from the source assembly, the detector assembly comprising a number of sensors sensitive to an output of the plurality of sources; and a computer coupled to the detector assembly to receive detector signals therefrom corresponding to the output of the plurality of sources sensed by the number of sensors, the computer programmed to process the detector signals via a deconvolution algorithm, wherein the number of sensors in the detector assembly is equal to N+L−1 where N is the number of sources and L is the length of a spectrum.

11. The analytical system of claim 10 wherein the computer is programmed to process the detector signals via a deconvolution algorithm by: constructing a detector signal matrix from the detector signals; multiplying the detector signal matrix by a deconvolution matrix to produce a spectrum matrix; and truncating the spectrum matrix after the first L elements to produce a pseudorandom spectrum.

12. The analytical system of claim 10 in the form of a mass spectrometer wherein each of the plurality of sources is an ion emitter and each sensor of the detector assembly is a Faraday cup.

13. The analytical system of claim 10 in the form of a monochromator wherein the plurality of sources is an array of entrance slits, the dispersing element is a grating, and the detector assembly is an array of charge coupled devices.

14. The analytical device of claim 10 in the form of a computer aided tomography scanner wherein the plurality of sources are X-ray emitting sources, the dispersing element is a sample being analyzed, and the sensors of the detector assembly are X-ray detectors.

15. The analytical system of claim 10 in the form of a magnetic resonance imager wherein the plurality of sources are radio frequency emitters, the dispersing element is a sample being analyzed, and the sensors of the detector assembly are magnetic coils.

16. The analytical system of claim 10 in the form of a ultrasound machine wherein the plurality of sources are speakers, the dispersing element is a sample being analyzed, and the sensors of the detector assembly are ultrasonic transducers.

17. An analytical system comprising:

a source assembly comprising a plurality of sources spatially arrayed in at least a first dimension;

a detector assembly spaced from the source assembly, the detector assembly comprising a number of sensors sensitive to an output of the plurality of sources; and a computer coupled to control activation of the sources in a spatially pseudo-random order in at least a first dimension, wherein the computer is coupled to control activation of the sources in a spatially pseudo-random order in at least a first dimension by:

activating successive ones of the plurality of sources with a respective pseudo-random number of unactivated sources between each respective pair of the activated sources in the array.

18. The analytical system of claim 17 wherein the plurality of sources are spatially arrayed uniformly in the first dimension.

19. The analytical system of claim 17 in the form of a mass spectrometer wherein each of the plurality of sources is an ion emitter and each sensor of the detector assembly is a Faraday cup.

20. The analytical system of claim 17 in the form of a monochromator wherein the plurality of sources is an array of entrance slits, the dispersing element is a grating, and the detector assembly is an array of charge coupled devices.

21. The analytical device of claim 17 in the form of a computer aided tomography scanner wherein the plurality of sources are X-ray emitting sources, the dispersing element is a sample being analyzed, and the sensors of the detector assembly are X-ray detectors.

22. The analytical system of claim 17 in the form of a magnetic resonance imager wherein the plurality of sources are radio frequency emitters, the dispersing element is a sample being analyzed, and the sensors of the detector assembly are magnetic coils.

23. The analytical system of claim 17 in the in the form of an ultrasound machine wherein the plurality of sources are speakers, the dispersing element is a sample being analyzed, and the sensors of the detector assembly are ultrasonic transducers.

24. An analytical device, comprising means for activating a number of pseudo-randomly arrayed ion sources to produce output;

a detector coupled to detect output produced by the pseudo-randomly arrayed ion sources and to produce detector signals corresponding to the detected output; and means for deconvoluting the detector signals to produce a pseudorandom spectrum.

25. The device of claim 24 wherein the means for deconvoluting comprises computing means for:

constructing a detector signal matrix from the detector signals;

multiplying the detector signal matrix by a deconvolution matrix to produce a spectrum matrix; and truncating the spectrum matrix after the first L elements to produce a pseudorandom spectrum.

26. An analytical device comprising:

a source assembly comprising a plurality of sources, the sources spatially arrayed pseudo-randomly in at least a first dimension; and a detector assembly spaced from the source assembly, the detector assembly comprising a number of sensors sensitive to an output of the plurality of sources, wherein each of the plurality of sources is an ion emitter source and the detector comprises an array of particle detectors.

27. The analytical device of claim 26 wherein the detector comprises an array of ion detectors.

28. The analytical device of claim 27 wherein the detector comprises an array of Faraday cups.

29. The analytical device of claim 26 wherein the number of sensors in the detector assembly is less than a number of sources in the source assembly.

30. The analytical device of claim 26 wherein the number of sensors in the detector assembly is equal to N+L−1 where N is the number of sources and L is the length of a spectrum.

31. The analytical device of claim 26 wherein the plurality of sources and the number of sensors arranged about respective concentric circles.

32. The analytical device of claim 26 wherein the ion emitter source is based on electron impact, field ionization or photoionization.

33. The analytical device of claim 26 wherein the ion emitter source is base on field ionization.

34. The analytical device of claim 26 wherein there are 2n-1 sources arranged in a pseudo-random sequence of a length equal to 2n-1.

35. The analytical device of claim 26 wherein each of the plurality of sources are formed on a common substrate.

36. The analytical device of claim 26 wherein each of the plurality of sources are micro-machined structures on a common substrate.

37. The analytical device of claim 26 wherein the plurality of sources are arranged about a closed surface.

38. The analytical device of claim 26 wherein the plurality of sources are arranged about a circle.

39. The analytical device of claim 26 wherein the plurality of sources are spatially arrayed pseudo-randomly in at least a second dimension.

40. The analytical device of claim 26 wherein the plurality of sources are spatially arrayed pseudo-randomly by a respective pseudo-random number of blanks between each respective pair of the sources in the array.

41. The analytical device of claim 26 further comprising a dispersion element positioned in a path between at least one of the plurality of sources and at least one of the sensors to disperse the output of at least one of the plurality of sources.

42. The analytical device of claim 41 wherein the dispersion element comprises a magnetic assembly positioned to create a magnetic field in the path between at least one of the plurality of sources and at least one of the sensors to disperse the output of at least one of the plurality of sources.

43. A mass spectrometer, comprising:

an ion source assembly comprising a plurality of ion sources, the sources spatially arrayed pseudo-randomly in at least a first dimension;

an ion detector assembly spaced from the source assembly, the ion detector assembly comprising a number of sensors sensitive to an output of the plurality of sources; and a computer coupled to the detector assembly to receive detector signals therefrom corresponding to the output of the plurality of ion sources sensed by the number of sensors, the computer programmed to process the detector signals via a deconvolution algorithm.

44. The mass spectrometer of claim 43 wherein the computer is programmed to process the detector signals via a deconvolution algorithm by:

constructing a detector signal matrix from the detector signals;

multiplying the detector signal matrix by a deconvolution matrix to produce a spectrum matrix; and truncating the spectrum matrix after the first L elements to produce a pseudorandom spectrum.

45. The mass spectrometer of claim 43 wherein the number of sensors in the detector assembly is equal to N+L−1 where N is the number of sources and L is the length of a spectrum.

46. A mass spectrometer system, comprising:

an ion source assembly comprising a plurality of ion sources spatially arrayed in at least a first dimension;

an ion detector assembly spaced from the source assembly, the ion detector assembly comprising a number of sensors sensitive to an output of the plurality of sources; and a computer coupled to control activation of the ion sources in a spatially pseudo-random order in at least a first dimension, wherein the computer is coupled to control activation of the ion sources in a spatially pseudo-random order in at least a first dimension by:

activating successive ones of the plurality of sources with a respective pseudo-random number of unactivated sources between each respective pair of the activated sources in the array.

47. The mass spectrometer system of claim 46 wherein the plurality of ion sources are spatially arrayed uniformly in the first dimension.

* * * * *

UNITED STATES PATENT AND TRADEMARK OFFICE

CERTIFICATE OF CORRECTION

PATENT NO. : 7,339,521 B2
APPLICATION NO. : 10/502842
DATED : March 4, 2008
INVENTOR(S) : Adi Scheidemann and Henry Hess It is certified that error appears in the above-identified patent and that said Letters Patent is hereby corrected as shown below:

1. On the Title page of the patent insert assignees' name:

--(73) Assignee: The University of Washington, Seattle WA (US)--.

2. At column 1, lines 17-19, please replace the Statement Regarding Federally Sponsored Research with the following:

This invention was made with U.S. Government support under grant number BIR-9214821 awarded by the National Science Foundation. The U.S. Government has certain rights in this invention.

3. Column 19, line 29, claim 2, first line, please replace "system claim 1," with device of claim 1.

4. Column 19, line 58, claim 5, first line, please replace "device" with system.

5. Column 20, line 43, claim 14, first line, please replace "device" with system.

6. Column 21, line 19, claim 21, first line, please replace "device" with system.

Signed and Sealed this

Fifth Day of May, 2009

JOHN DOLL

*Acting Director of the United States Patent and Trademark Office*